(12) United States Patent
Rathnam et al.

(10) Patent No.: US 8,866,780 B2
(45) Date of Patent: *Oct. 21, 2014

(54) MULTI-DIMENSIONAL SCROLL WHEEL

(71) Applicant: Apple Inc., Cupertino, CA (US)

(72) Inventors: Lakshman Rathnam, Mountain View, CA (US); Louis Bokma, San Jose, CA (US); Fletcher Rothkopf, Los Altos, CA (US); Andrea Mucignat, San Francisco, CA (US); Erturk Kocalar, Sunnyvale, CA (US); Benjamin Lyon, San Jose, CA (US); Joseph Fisher, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/858,603

(22) Filed: Apr. 8, 2013

(65) Prior Publication Data

US 2014/0092057 A1   Apr. 3, 2014

Related U.S. Application Data

(63) Continuation of application No. 12/205,757, filed on Sep. 5, 2008, now Pat. No. 8,416,198.

(60) Provisional application No. 60/992,056, filed on Dec. 3, 2007, provisional application No. 61/017,436, filed on Dec. 28, 2007.

(51) Int. Cl.
| | |
|---|---|
| *G09G 5/00* | (2006.01) |
| *G06F 3/041* | (2006.01) |
| *G06F 3/0354* | (2013.01) |
| *G06F 3/038* | (2013.01) |
| *G06F 3/0488* | (2013.01) |
| *G06F 3/044* | (2006.01) |
| *G06F 3/01* | (2006.01) |

(52) U.S. Cl.
CPC ............ *G06F 3/041* (2013.01); *G06F 3/03547* (2013.01); *G06F 3/038* (2013.01); *G06F 2203/04808* (2013.01); *G06F 3/04883* (2013.01); *G06F 3/044* (2013.01); *G06F 3/017* (2013.01); *G06F 3/0416* (2013.01)
USPC ........................... 345/173; 345/156; 345/174

(58) Field of Classification Search
CPC ... G06F 3/0488; G06F 3/04883; G06F 3/044; G06F 3/016; G06F 3/011; G06F 3/038
USPC .......... 345/173, 156, 661, 174; 715/738, 863, 715/864
See application file for complete search history.

(56) References Cited

U.S. PATENT DOCUMENTS

| | | | |
|---|---|---|---|
| 1,061,578 | A | 5/1913 | Wischhusen et al. |
| 2,063,276 | A | 12/1936 | Thomas |

(Continued)

FOREIGN PATENT DOCUMENTS

| | | |
|---|---|---|
| CN | 1139235 | 1/1997 |
| CN | 1455615 | 11/2003 |

(Continued)

OTHER PUBLICATIONS

"About Quicktip®" www.logicad3d.com/docs/qt.html, downloaded Apr. 8, 2002.

(Continued)

*Primary Examiner* — Chante Harrison
(74) *Attorney, Agent, or Firm* — Morrison & Foerster LLP

(57) ABSTRACT

A multi-dimensional scroll wheel is disclosed. Scroll wheel circuitry is provided to detect input gestures that traverse the center of the scroll wheel and to detect multi-touch input. The scroll wheel can include a first plurality of sensor elements arranged in a first closed loop and a second plurality of sensor elements arranged in a second closed loop, the first and second closed loops being concentrically arranged about the center of the scroll wheel.

18 Claims, 24 Drawing Sheets

(56) References Cited

U.S. PATENT DOCUMENTS

| | | |
|---|---|---|
| 2,798,907 A | 7/1957 | Schneider |
| 2,903,229 A | 9/1959 | Landge |
| 2,945,111 A | 7/1960 | McCormick |
| 3,005,055 A | 10/1961 | Mattke |
| 3,965,399 A | 6/1976 | Walker et al. |
| 3,996,441 A | 12/1976 | Ohashi |
| 4,029,915 A | 6/1977 | Ojima |
| 4,103,252 A | 7/1978 | Bobick |
| 4,110,749 A | 8/1978 | Janko et al. |
| 4,115,670 A | 9/1978 | Chandler |
| 4,121,204 A | 10/1978 | Welch et al. |
| 4,129,747 A | 12/1978 | Pepper |
| 4,158,216 A | 6/1979 | Bigelow |
| 4,242,676 A | 12/1980 | Piguet et al. |
| 4,246,452 A | 1/1981 | Chandler |
| 4,264,903 A | 4/1981 | Bigelow |
| 4,266,144 A | 5/1981 | Bristol |
| 4,293,734 A | 10/1981 | Pepper, Jr. |
| D264,969 S | 6/1982 | McGourty |
| 4,338,502 A | 7/1982 | Hashimoto et al. |
| 4,380,007 A | 4/1983 | Steinegger |
| 4,380,040 A | 4/1983 | Posset |
| 4,394,649 A | 7/1983 | Suchoff et al. |
| 4,475,008 A | 10/1984 | Doi et al. |
| 4,570,149 A | 2/1986 | Thornburg et al. |
| 4,583,161 A | 4/1986 | Gunderson et al. |
| 4,587,378 A | 5/1986 | Moore |
| 4,604,786 A | 8/1986 | Howie, Jr. |
| 4,613,736 A | 9/1986 | Shichijo et al. |
| 4,644,100 A | 2/1987 | Brenner et al. |
| 4,719,524 A | 1/1988 | Morishima et al. |
| 4,734,034 A | 3/1988 | Maness et al. |
| 4,736,191 A | 4/1988 | Matzke et al. |
| 4,739,191 A | 4/1988 | Puar |
| 4,739,299 A | 4/1988 | Eventoff et al. |
| 4,752,655 A | 6/1988 | Tajiri et al. |
| 4,755,765 A | 7/1988 | Ferland |
| 4,764,717 A | 8/1988 | Tucker et al. |
| 4,771,139 A | 9/1988 | DeSmet |
| 4,798,919 A | 1/1989 | Miessler et al. |
| 4,810,992 A | 3/1989 | Eventoff |
| 4,822,957 A | 4/1989 | Talmage, Jr. et al. |
| 4,831,359 A | 5/1989 | Newell |
| 4,849,852 A | 7/1989 | Mullins |
| 4,856,993 A | 8/1989 | Maness et al. |
| 4,860,768 A | 8/1989 | Hon et al. |
| 4,866,602 A | 9/1989 | Hall |
| 4,876,524 A | 10/1989 | Jenkins |
| 4,897,511 A | 1/1990 | Itaya et al. |
| 4,914,624 A | 4/1990 | Dunthorn |
| 4,917,516 A | 4/1990 | Retter |
| 4,943,889 A | 7/1990 | Ohmatoi |
| 4,951,036 A | 8/1990 | Grueter et al. |
| 4,954,823 A | 9/1990 | Binstead |
| 4,976,435 A | 12/1990 | Shatford et al. |
| 4,990,900 A | 2/1991 | Kikuchi |
| 5,008,497 A | 4/1991 | Asher |
| 5,036,321 A | 7/1991 | Leach et al. |
| 5,053,757 A | 10/1991 | Meadows |
| 5,086,870 A | 2/1992 | Bolduc |
| 5,125,077 A | 6/1992 | Hall |
| 5,159,159 A | 10/1992 | Asher |
| 5,179,648 A | 1/1993 | Hauck |
| 5,186,646 A | 2/1993 | Pederson |
| 5,192,082 A | 3/1993 | Inoue et al. |
| 5,193,669 A | 3/1993 | Demeo et al. |
| 5,231,326 A | 7/1993 | Echols |
| 5,237,311 A | 8/1993 | Mailey et al. |
| 5,278,362 A | 1/1994 | Ohashi |
| 5,305,017 A | 4/1994 | Gerpheide |
| 5,313,027 A | 5/1994 | Inoue et al. |
| D349,280 S | 8/1994 | Kaneko |
| 5,339,213 A | 8/1994 | O'Callaghan |
| 5,367,199 A | 11/1994 | Lefkowitz et al. |
| 5,374,787 A | 12/1994 | Miller et al. |
| 5,379,057 A | 1/1995 | Clough et al. |
| 5,404,152 A | 4/1995 | Nagai |
| 5,408,621 A | 4/1995 | Ben-Arie |
| 5,414,445 A | 5/1995 | Kaneko et al. |
| 5,416,498 A | 5/1995 | Grant |
| 5,424,756 A | 6/1995 | Ho et al. |
| 5,432,531 A | 7/1995 | Calder et al. |
| 5,438,331 A | 8/1995 | Gilligan et al. |
| D362,431 S | 9/1995 | Kaneko et al. |
| 5,450,075 A | 9/1995 | Waddington |
| 5,453,761 A | 9/1995 | Tanaka |
| 5,473,343 A | 12/1995 | Kimmich et al. |
| 5,473,344 A | 12/1995 | Bacon et al. |
| 5,479,192 A | 12/1995 | Carroll, Jr. et al. |
| 5,494,157 A | 2/1996 | Golenz et al. |
| 5,495,566 A | 2/1996 | Kwatinetz |
| 5,508,703 A | 4/1996 | Okamura et al. |
| 5,508,717 A | 4/1996 | Miller |
| 5,543,588 A | 8/1996 | Bisset et al. |
| 5,543,591 A | 8/1996 | Gillespie et al. |
| 5,555,004 A | 9/1996 | Ono et al. |
| 5,559,301 A | 9/1996 | Bryan, Jr. et al. |
| 5,559,943 A | 9/1996 | Cyr et al. |
| 5,561,445 A | 10/1996 | Miwa et al. |
| 5,564,112 A | 10/1996 | Hayes et al. |
| 5,565,887 A | 10/1996 | McCambridge et al. |
| 5,578,817 A | 11/1996 | Bidiville et al. |
| 5,581,670 A | 12/1996 | Bier et al. |
| 5,585,823 A | 12/1996 | Duchon et al. |
| 5,589,856 A | 12/1996 | Stein et al. |
| 5,589,893 A | 12/1996 | Gaughan et al. |
| 5,596,347 A | 1/1997 | Robertson et al. |
| 5,596,697 A | 1/1997 | Foster et al. |
| 5,598,183 A | 1/1997 | Robertson et al. |
| 5,611,040 A | 3/1997 | Brewer et al. |
| 5,611,060 A | 3/1997 | Belfiore et al. |
| 5,613,137 A | 3/1997 | Bertram et al. |
| 5,617,114 A | 4/1997 | Bier et al. |
| 5,627,531 A | 5/1997 | Posso et al. |
| 5,632,679 A | 5/1997 | Tremmel |
| 5,640,258 A | 6/1997 | Kurashima et al. |
| 5,648,642 A | 7/1997 | Miller et al. |
| D382,550 S | 8/1997 | Kaneko et al. |
| 5,657,012 A | 8/1997 | Tait |
| 5,661,632 A | 8/1997 | Register |
| D385,542 S | 10/1997 | Kaneko et al. |
| 5,675,362 A | 10/1997 | Clough et al. |
| 5,689,285 A | 11/1997 | Asher |
| 5,721,849 A | 2/1998 | Amro |
| 5,726,687 A | 3/1998 | Belfiore et al. |
| 5,729,219 A | 3/1998 | Armstrong et al. |
| 5,730,165 A | 3/1998 | Philipp |
| 5,748,185 A | 5/1998 | Stephan et al. |
| 5,751,274 A | 5/1998 | Davis |
| 5,754,890 A | 5/1998 | Holmdahl et al. |
| 5,764,066 A | 6/1998 | Novak et al. |
| 5,777,605 A | 7/1998 | Yoshinobu et al. |
| 5,786,818 A | 7/1998 | Brewer et al. |
| 5,790,769 A | 8/1998 | Buxton et al. |
| 5,798,752 A | 8/1998 | Buxton et al. |
| 5,805,144 A | 9/1998 | Scholder et al. |
| 5,808,602 A | 9/1998 | Sellers |
| 5,812,239 A | 9/1998 | Eger |
| 5,812,498 A | 9/1998 | Teres |
| 5,815,141 A | 9/1998 | Phares |
| 5,825,351 A | 10/1998 | Tam |
| 5,825,352 A | 10/1998 | Bisset et al. |
| 5,825,353 A | 10/1998 | Will |
| 5,828,364 A | 10/1998 | Siddiqui |
| 5,838,304 A | 11/1998 | Hall |
| 5,841,078 A | 11/1998 | Miller et al. |
| 5,841,423 A | 11/1998 | Carroll, Jr. et al. |
| D402,281 S | 12/1998 | Ledbetter et al. |
| 5,850,213 A | 12/1998 | Imai et al. |
| 5,856,645 A | 1/1999 | Norton |
| 5,856,822 A | 1/1999 | Du et al. |
| 5,859,629 A | 1/1999 | Tognazzini |
| 5,861,875 A | 1/1999 | Gerpheide |
| 5,869,791 A | 2/1999 | Young |

(56) References Cited

U.S. PATENT DOCUMENTS

| | | |
|---|---|---|
| 5,875,311 A | 2/1999 | Bertram et al. |
| 5,883,619 A | 3/1999 | Ho et al. |
| 5,889,236 A | 3/1999 | Gillespie et al. |
| 5,889,511 A | 3/1999 | Ong et al. |
| 5,894,117 A | 4/1999 | Kamishima |
| 5,903,229 A | 5/1999 | Kishi |
| 5,907,152 A | 5/1999 | Dandiliker et al. |
| 5,907,318 A | 5/1999 | Medina |
| 5,909,211 A | 6/1999 | Combs et al. |
| 5,910,802 A | 6/1999 | Shields et al. |
| 5,914,706 A | 6/1999 | Kono |
| 5,923,388 A | 7/1999 | Kurashima et al. |
| D412,940 S | 8/1999 | Kato et al. |
| 5,933,102 A | 8/1999 | Miller et al. |
| 5,933,141 A | 8/1999 | Smith |
| 5,936,619 A | 8/1999 | Nagasaki et al. |
| 5,943,044 A | 8/1999 | Martinelli et al. |
| 5,953,000 A | 9/1999 | Weirich |
| 5,956,019 A | 9/1999 | Bang et al. |
| 5,959,610 A | 9/1999 | Silfvast |
| 5,959,611 A | 9/1999 | Smailagic et al. |
| 5,964,661 A | 10/1999 | Dodge |
| 5,973,668 A | 10/1999 | Watanabe |
| 6,000,000 A | 12/1999 | Hawkins et al. |
| 6,002,093 A | 12/1999 | Hrehor et al. |
| 6,002,389 A | 12/1999 | Kasser |
| 6,005,299 A | 12/1999 | Hengst |
| 6,025,832 A | 2/2000 | Sudo et al. |
| 6,031,518 A | 2/2000 | Adams et al. |
| 6,034,672 A | 3/2000 | Gaultier et al. |
| 6,057,829 A | 5/2000 | Silfvast |
| 6,075,533 A | 6/2000 | Chang |
| 6,084,574 A | 7/2000 | Bidiville |
| D430,169 S | 8/2000 | Scibora |
| 6,097,372 A | 8/2000 | Suzuki |
| 6,104,790 A | 8/2000 | Narayanaswami |
| 6,122,526 A | 9/2000 | Parulski et al. |
| 6,124,587 A | 9/2000 | Bidiville et al. |
| 6,128,006 A | 10/2000 | Rosenberg et al. |
| 6,131,048 A | 10/2000 | Sudo et al. |
| 6,141,068 A | 10/2000 | Iijima |
| 6,147,856 A | 11/2000 | Karidis |
| 6,163,312 A | 12/2000 | Furuya |
| 6,166,721 A | 12/2000 | Kuroiwa et al. |
| 6,179,496 B1 | 1/2001 | Chou |
| 6,181,322 B1 | 1/2001 | Nanavati |
| D437,860 S | 2/2001 | Suzuki et al. |
| 6,188,391 B1 | 2/2001 | Seely et al. |
| 6,188,393 B1 | 2/2001 | Shu |
| 6,191,774 B1 | 2/2001 | Schena et al. |
| 6,198,054 B1 | 3/2001 | Janniere |
| 6,198,473 B1 | 3/2001 | Armstrong |
| 6,211,861 B1 | 4/2001 | Rosenberg et al. |
| 6,219,038 B1 | 4/2001 | Cho |
| 6,222,528 B1 | 4/2001 | Gerpheide et al. |
| D442,592 S | 5/2001 | Ledbetter et al. |
| 6,225,976 B1 | 5/2001 | Yates et al. |
| 6,225,980 B1 | 5/2001 | Weiss et al. |
| 6,226,534 B1 | 5/2001 | Aizawa |
| 6,227,966 B1 | 5/2001 | Yokoi |
| D443,616 S | 6/2001 | Fisher et al. |
| 6,243,078 B1 | 6/2001 | Rosenberg |
| 6,243,080 B1 | 6/2001 | Molne |
| 6,243,646 B1 | 6/2001 | Ozaki et al. |
| 6,248,017 B1 | 6/2001 | Roach |
| 6,254,477 B1 | 7/2001 | Sasaki et al. |
| 6,256,011 B1 | 7/2001 | Culver |
| 6,259,491 B1 | 7/2001 | Ekedahl et al. |
| 6,262,717 B1 | 7/2001 | Donohue et al. |
| 6,262,785 B1 | 7/2001 | Kim |
| 6,266,050 B1 | 7/2001 | Oh et al. |
| 6,285,211 B1 | 9/2001 | Sample et al. |
| D448,810 S | 10/2001 | Goto |
| 6,297,795 B1 | 10/2001 | Kato et al. |
| 6,297,811 B1 | 10/2001 | Kent et al. |
| 6,300,946 B1 | 10/2001 | Lincke et al. |
| 6,307,539 B2 | 10/2001 | Suzuki |
| D450,713 S | 11/2001 | Masamitsu et al. |
| 6,314,483 B1 | 11/2001 | Goto et al. |
| 6,321,441 B1 | 11/2001 | Davidson et al. |
| 6,323,845 B1 | 11/2001 | Robbins |
| D452,250 S | 12/2001 | Chan |
| 6,337,678 B1 | 1/2002 | Fish |
| 6,340,800 B1 | 1/2002 | Zhai et al. |
| D454,568 S | 3/2002 | Andre et al. |
| 6,357,887 B1 | 3/2002 | Novak |
| D455,793 S | 4/2002 | Lin |
| 6,373,265 B1 | 4/2002 | Morimoto et al. |
| 6,373,470 B1 | 4/2002 | Andre et al. |
| 6,377,530 B1 | 4/2002 | Burrows |
| 6,396,523 B1 | 5/2002 | Segal et al. |
| 6,424,338 B1 | 7/2002 | Anderson |
| 6,429,846 B2 | 8/2002 | Rosenberg et al. |
| 6,429,852 B1 | 8/2002 | Adams et al. |
| 6,452,514 B1 | 9/2002 | Philipp |
| 6,465,271 B1 | 10/2002 | Ko et al. |
| 6,473,069 B1 | 10/2002 | Gerphelde |
| 6,492,602 B2 | 12/2002 | Asai et al. |
| 6,492,979 B1 | 12/2002 | Kent et al. |
| 6,496,181 B1 | 12/2002 | Bomer et al. |
| 6,497,412 B1 | 12/2002 | Bramm |
| D468,365 S | 1/2003 | Bransky et al. |
| D469,109 S | 1/2003 | Andre et al. |
| D472,245 S | 3/2003 | Andre et al. |
| 6,546,231 B1 | 4/2003 | Someya et al. |
| 6,563,487 B2 | 5/2003 | Martin et al. |
| 6,587,091 B2 | 7/2003 | Serpa |
| 6,606,244 B1 | 8/2003 | Liu et al. |
| 6,618,909 B1 | 9/2003 | Yang |
| 6,636,197 B1 | 10/2003 | Goldenberg et al. |
| 6,639,584 B1 | 10/2003 | Li |
| 6,640,250 B1 | 10/2003 | Chang et al. |
| 6,650,975 B2 | 11/2003 | Ruffner |
| D483,809 S | 12/2003 | Lim |
| 6,658,773 B2 | 12/2003 | Rohne et al. |
| 6,664,951 B1 | 12/2003 | Fujii et al. |
| 6,677,927 B1 | 1/2004 | Bruck et al. |
| 6,678,891 B1 | 1/2004 | Wilcox et al. |
| 6,686,904 B1 | 2/2004 | Sherman et al. |
| 6,686,906 B2 | 2/2004 | Salminen et al. |
| 6,703,550 B2 | 3/2004 | Chu |
| 6,724,817 B1 | 4/2004 | Simpson et al. |
| 6,727,889 B2 | 4/2004 | Shaw |
| D489,731 S | 5/2004 | Huang |
| 6,738,045 B2 | 5/2004 | Hinckley et al. |
| 6,750,803 B2 | 6/2004 | Yates et al. |
| 6,781,576 B2 | 8/2004 | Tamura |
| 6,784,384 B2 | 8/2004 | Park et al. |
| 6,788,288 B2 | 9/2004 | Ano |
| 6,791,533 B2 | 9/2004 | Su |
| 6,795,057 B2 | 9/2004 | Gordon |
| D497,618 S | 10/2004 | Andre et al. |
| 6,810,271 B1 | 10/2004 | Wood et al. |
| 6,822,640 B2 | 11/2004 | Derocher |
| 6,834,975 B2 | 12/2004 | Chu-Chia et al. |
| 6,844,872 B1 | 1/2005 | Farag et al. |
| 6,855,899 B2 | 2/2005 | Sotome |
| 6,865,718 B2 | 3/2005 | Levi Montalcini |
| 6,886,842 B2 | 5/2005 | Vey et al. |
| 6,894,916 B2 | 5/2005 | Reohr et al. |
| D506,476 S | 6/2005 | Andre et al. |
| 6,922,189 B2 | 7/2005 | Fujiyoshi |
| 6,930,494 B2 | 8/2005 | Tesdahl et al. |
| 6,958,614 B2 | 10/2005 | Morimoto |
| 6,977,808 B2 | 12/2005 | Lam et al. |
| 6,978,127 B1 | 12/2005 | Bulthuis et al. |
| 6,985,137 B2 | 1/2006 | Kaikuranta |
| 7,006,077 B1 | 2/2006 | Uusimaki |
| 7,019,225 B2 | 3/2006 | Matsumoto et al. |
| 7,046,230 B2 | 5/2006 | Zadesky et al. |
| 7,050,292 B2 | 5/2006 | Shimura et al. |
| 7,069,044 B2 | 6/2006 | Okada et al. |
| 7,078,633 B2 | 7/2006 | Ihalainen |
| 7,084,856 B2 | 8/2006 | Huppi |

(56) References Cited

U.S. PATENT DOCUMENTS

| | | |
|---|---|---|
| 7,113,196 B2 | 9/2006 | Kerr |
| 7,117,136 B1 | 10/2006 | Rosedale |
| 7,119,792 B1 | 10/2006 | Andre et al. |
| 7,215,319 B2 | 5/2007 | Kamijo et al. |
| 7,233,318 B1 | 6/2007 | Farag et al. |
| 7,236,154 B1 | 6/2007 | Kerr et al. |
| 7,236,159 B1 | 6/2007 | Siversson |
| 7,253,643 B1 | 8/2007 | Seguine |
| 7,279,647 B2 | 10/2007 | Philipp |
| 7,288,732 B2 | 10/2007 | Hashida |
| 7,297,883 B2 | 11/2007 | Rochon et al. |
| 7,310,089 B2 | 12/2007 | Baker et al. |
| 7,312,785 B2 | 12/2007 | Tsuk et al. |
| 7,321,103 B2 | 1/2008 | Nakanishi et al. |
| 7,333,092 B2 | 2/2008 | Zadesky et al. |
| 7,348,898 B2 | 3/2008 | Ono |
| 7,382,139 B2 | 6/2008 | Mackey |
| 7,394,038 B2 | 7/2008 | Chang |
| 7,395,081 B2 | 7/2008 | Bonnelykke Kristensen |
| 7,397,467 B2 | 7/2008 | Park et al. |
| 7,439,963 B2 | 10/2008 | Geaghan et al. |
| 7,466,307 B2 | 12/2008 | Trent et al. |
| 7,479,949 B2 | 1/2009 | Jobs et al. |
| 7,486,323 B2 | 2/2009 | Lee et al. |
| 7,502,016 B2 | 3/2009 | Trent, Jr. et al. |
| 7,503,193 B2 | 3/2009 | Schoene et al. |
| 7,593,782 B2 | 9/2009 | Jobs et al. |
| 7,645,955 B2 | 1/2010 | Huang et al. |
| 7,671,837 B2 | 3/2010 | Forsblad et al. |
| 7,708,051 B2 | 5/2010 | Katsumi et al. |
| 7,772,507 B2 | 8/2010 | Orr et al. |
| 8,581,879 B2 * | 11/2013 | Vieta ............... 345/174 |
| 2001/0011991 A1 | 8/2001 | Wang et al. |
| 2001/0011993 A1 | 8/2001 | Saarinen |
| 2001/0033270 A1 | 10/2001 | Osawa et al. |
| 2001/0043545 A1 | 11/2001 | Aratani |
| 2001/0050673 A1 | 12/2001 | Davenport |
| 2001/0051046 A1 | 12/2001 | Watanabe et al. |
| 2002/0000978 A1 | 1/2002 | Gerpheide |
| 2002/0011993 A1 | 1/2002 | Lui et al. |
| 2002/0027547 A1 | 3/2002 | Kamijo |
| 2002/0030665 A1 | 3/2002 | Ano |
| 2002/0033848 A1 | 3/2002 | Sciammarella et al. |
| 2002/0039493 A1 | 4/2002 | Tanaka |
| 2002/0045960 A1 | 4/2002 | Phillips et al. |
| 2002/0071550 A1 | 6/2002 | Pletikosa |
| 2002/0089545 A1 | 7/2002 | Levi Montalcini |
| 2002/0103796 A1 | 8/2002 | Hartley |
| 2002/0118131 A1 | 8/2002 | Yates et al. |
| 2002/0118169 A1 | 8/2002 | Hinckley et al. |
| 2002/0145594 A1 | 10/2002 | Derocher |
| 2002/0154090 A1 | 10/2002 | Lin |
| 2002/0158844 A1 | 10/2002 | McLoone et al. |
| 2002/0164156 A1 | 11/2002 | Bilbrey |
| 2002/0168947 A1 | 11/2002 | Lemley |
| 2002/0180701 A1 | 12/2002 | Hayama et al. |
| 2002/0196239 A1 | 12/2002 | Lee |
| 2003/0002246 A1 | 1/2003 | Kerr |
| 2003/0025679 A1 | 2/2003 | Taylor et al. |
| 2003/0028346 A1 | 2/2003 | Sinclair et al. |
| 2003/0043121 A1 | 3/2003 | Chen |
| 2003/0043174 A1 | 3/2003 | Hinckley et al. |
| 2003/0050092 A1 | 3/2003 | Yun |
| 2003/0076301 A1 | 4/2003 | Tsuk et al. |
| 2003/0076303 A1 | 4/2003 | Huppi |
| 2003/0076306 A1 | 4/2003 | Zadesky et al. |
| 2003/0091377 A1 | 5/2003 | Hsu et al. |
| 2003/0095095 A1 | 5/2003 | Pihlaja |
| 2003/0095096 A1 | 5/2003 | Robbin et al. |
| 2003/0098851 A1 | 5/2003 | Brink |
| 2003/0103043 A1 | 6/2003 | Mulligan et al. |
| 2003/0122792 A1 | 7/2003 | Yamamoto et al. |
| 2003/0135292 A1 | 7/2003 | Husgafvel et al. |
| 2003/0142081 A1 | 7/2003 | Iizuka et al. |
| 2003/0184517 A1 | 10/2003 | Senzui et al. |
| 2003/0197740 A1 | 10/2003 | Reponen |
| 2003/0206202 A1 | 11/2003 | Moriya |
| 2003/0210537 A1 | 11/2003 | Engelmann |
| 2003/0224831 A1 | 12/2003 | Engstrom et al. |
| 2004/0027341 A1 | 2/2004 | Derocher |
| 2004/0074756 A1 | 4/2004 | Kawakami et al. |
| 2004/0080682 A1 | 4/2004 | Dalton |
| 2004/0109357 A1 | 6/2004 | Cernea et al. |
| 2004/0150619 A1 | 8/2004 | Baudisch et al. |
| 2004/0156192 A1 | 8/2004 | Kerr et al. |
| 2004/0178997 A1 | 9/2004 | Gillespie et al. |
| 2004/0200699 A1 | 10/2004 | Matsumoto et al. |
| 2004/0215986 A1 | 10/2004 | Shakkarwar |
| 2004/0224638 A1 | 11/2004 | Fadell et al. |
| 2004/0239622 A1 | 12/2004 | Proctor et al. |
| 2004/0252109 A1 | 12/2004 | Trent, Jr. et al. |
| 2004/0252867 A1 | 12/2004 | Lan et al. |
| 2004/0253989 A1 | 12/2004 | Tupler et al. |
| 2004/0263388 A1 | 12/2004 | Krumm et al. |
| 2004/0267874 A1 | 12/2004 | Westberg et al. |
| 2005/0012644 A1 | 1/2005 | Hurst et al. |
| 2005/0017957 A1 | 1/2005 | Yi |
| 2005/0024341 A1 | 2/2005 | Gillespie et al. |
| 2005/0030048 A1 | 2/2005 | Bolender |
| 2005/0052425 A1 | 3/2005 | Zadesky et al. |
| 2005/0052426 A1 | 3/2005 | Hagermoser et al. |
| 2005/0052429 A1 | 3/2005 | Philipp |
| 2005/0068304 A1 | 3/2005 | Lewis et al. |
| 2005/0083299 A1 | 4/2005 | Nagasaka |
| 2005/0083307 A1 | 4/2005 | Aufderheide |
| 2005/0090288 A1 | 4/2005 | Stohr et al. |
| 2005/0104867 A1 | 5/2005 | Westerman et al. |
| 2005/0110768 A1 | 5/2005 | Marriott et al. |
| 2005/0129199 A1 | 6/2005 | Abe |
| 2005/0139460 A1 | 6/2005 | Hosaka |
| 2005/0140657 A1 | 6/2005 | Park et al. |
| 2005/0143124 A1 | 6/2005 | Kennedy et al. |
| 2005/0156881 A1 | 7/2005 | Trent et al. |
| 2005/0162402 A1 | 7/2005 | Watanachote |
| 2005/0204309 A1 | 9/2005 | Szeto |
| 2005/0237308 A1 | 10/2005 | Autio et al. |
| 2006/0026521 A1 | 2/2006 | Hotelling et al. |
| 2006/0026535 A1 | 2/2006 | Hotelling et al. |
| 2006/0026536 A1 | 2/2006 | Hotelling et al. |
| 2006/0032680 A1 | 2/2006 | Elias et al. |
| 2006/0038791 A1 | 2/2006 | Mackey |
| 2006/0066582 A1 | 3/2006 | Lyon et al. |
| 2006/0066588 A1 | 3/2006 | Lyon et al. |
| 2006/0095848 A1 | 5/2006 | Naik |
| 2006/0097991 A1 | 5/2006 | Hotelling et al. |
| 2006/0131156 A1 | 6/2006 | Voelckers |
| 2006/0143574 A1 | 6/2006 | Ito et al. |
| 2006/0174568 A1 | 8/2006 | Kinoshita et al. |
| 2006/0181517 A1 | 8/2006 | Zadesky et al. |
| 2006/0197750 A1 | 9/2006 | Kerr et al. |
| 2006/0232557 A1 | 10/2006 | Fallot-Burghardt |
| 2006/0236262 A1 | 10/2006 | Bathiche et al. |
| 2006/0250377 A1 | 11/2006 | Zadesky et al. |
| 2006/0274042 A1 | 12/2006 | Krah et al. |
| 2006/0274905 A1 | 12/2006 | Lindahl et al. |
| 2006/0279896 A1 | 12/2006 | Bruwer |
| 2006/0284836 A1 | 12/2006 | Philipp |
| 2007/0013671 A1 | 1/2007 | Zadesky et al. |
| 2007/0018970 A1 | 1/2007 | Tabasso et al. |
| 2007/0052044 A1 | 3/2007 | Forsblad et al. |
| 2007/0052691 A1 | 3/2007 | Zadesky et al. |
| 2007/0080936 A1 | 4/2007 | Tsuk et al. |
| 2007/0080938 A1 | 4/2007 | Robbin et al. |
| 2007/0080952 A1 | 4/2007 | Lynch et al. |
| 2007/0083822 A1 | 4/2007 | Robbin et al. |
| 2007/0085841 A1 | 4/2007 | Tsuk et al. |
| 2007/0097086 A1 | 5/2007 | Battles et al. |
| 2007/0120834 A1 | 5/2007 | Boillot |
| 2007/0126696 A1 | 6/2007 | Boillot |
| 2007/0152975 A1 | 7/2007 | Ogihara |
| 2007/0152977 A1 | 7/2007 | Ng et al. |
| 2007/0152983 A1 | 7/2007 | McKillop et al. |
| 2007/0155434 A1 | 7/2007 | Jobs et al. |
| 2007/0157089 A1 | 7/2007 | Van Os et al. |

(56) References Cited

U.S. PATENT DOCUMENTS

| | | |
|---|---|---|
| 2007/0242057 A1 | 10/2007 | Zadesky et al. |
| 2007/0247421 A1 | 10/2007 | Orsley et al. |
| 2007/0247443 A1 | 10/2007 | Philipp |
| 2007/0271516 A1 | 11/2007 | Carmichael |
| 2007/0273671 A1 | 11/2007 | Zadesky et al. |
| 2007/0276525 A1 | 11/2007 | Zadesky et al. |
| 2007/0279394 A1 | 12/2007 | Lampell et al. |
| 2007/0285404 A1 | 12/2007 | Rimon et al. |
| 2007/0290990 A1 | 12/2007 | Robbin et al. |
| 2007/0291016 A1 | 12/2007 | Philipp |
| 2007/0296709 A1 | 12/2007 | GuangHai |
| 2008/0006453 A1 | 1/2008 | Hotelling et al. |
| 2008/0006454 A1 | 1/2008 | Hotelling |
| 2008/0007533 A1 | 1/2008 | Hotelling et al. |
| 2008/0007539 A1 | 1/2008 | Hotelling et al. |
| 2008/0012837 A1 | 1/2008 | Marriott et al. |
| 2008/0018615 A1 | 1/2008 | Zadesky et al. |
| 2008/0018616 A1 | 1/2008 | Lampell et al. |
| 2008/0018617 A1 | 1/2008 | Ng et al. |
| 2008/0036473 A1 | 2/2008 | Jansson |
| 2008/0036734 A1 | 2/2008 | Forsblad et al. |
| 2008/0060925 A1 | 3/2008 | Weber et al. |
| 2008/0062141 A1 | 3/2008 | Chandhri |
| 2008/0069412 A1 | 3/2008 | Champagne et al. |
| 2008/0079699 A1 | 4/2008 | Mackey |
| 2008/0087476 A1 | 4/2008 | Prest |
| 2008/0088582 A1 | 4/2008 | Prest |
| 2008/0088596 A1 | 4/2008 | Prest |
| 2008/0088597 A1 | 4/2008 | Prest |
| 2008/0088600 A1 | 4/2008 | Prest |
| 2008/0094352 A1 | 4/2008 | Tsuk et al. |
| 2008/0098330 A1 | 4/2008 | Tsuk et al. |
| 2008/0110739 A1 | 5/2008 | Peng et al. |
| 2008/0111795 A1 | 5/2008 | Bollinger |
| 2008/0143681 A1 | 6/2008 | XiaoPing |
| 2008/0158145 A1 | 7/2008 | Westerman |
| 2008/0165141 A1 | 7/2008 | Christie |
| 2008/0165158 A1 | 7/2008 | Hotelling et al. |
| 2008/0196945 A1 | 8/2008 | Konstas |
| 2008/0202824 A1 | 8/2008 | Philipp et al. |
| 2008/0209442 A1 | 8/2008 | Setlur et al. |
| 2008/0264767 A1 | 10/2008 | Chen et al. |
| 2008/0280651 A1 | 11/2008 | Duarte |
| 2008/0284742 A1 | 11/2008 | Prest |
| 2008/0293274 A1 | 11/2008 | Milan |
| 2009/0021267 A1 | 1/2009 | Golovchenko et al. |
| 2009/0026558 A1 | 1/2009 | Bauer et al. |
| 2009/0033635 A1 | 2/2009 | Wai |
| 2009/0036176 A1 | 2/2009 | Ure |
| 2009/0058687 A1 | 3/2009 | Rothkopf et al. |
| 2009/0058801 A1 | 3/2009 | Bull |
| 2009/0058802 A1 | 3/2009 | Orsley et al. |
| 2009/0073130 A1 | 3/2009 | Weber et al. |
| 2009/0078551 A1 | 3/2009 | Kang |
| 2009/0109181 A1 | 4/2009 | Hui et al. |
| 2009/0141046 A1 | 6/2009 | Rathnam et al. |
| 2009/0160771 A1 | 6/2009 | Hinckley et al. |
| 2009/0179854 A1 | 7/2009 | Weber et al. |
| 2009/0197059 A1 | 8/2009 | Weber et al. |
| 2009/0229892 A1 | 9/2009 | Fisher et al. |
| 2009/0273573 A1 | 11/2009 | Hotelling |
| 2010/0058251 A1 | 3/2010 | Rottler et al. |
| 2010/0060568 A1 | 3/2010 | Fisher et al. |
| 2010/0073319 A1 | 3/2010 | Lyon et al. |
| 2010/0149127 A1 | 6/2010 | Fisher et al. |
| 2010/0289759 A1 | 11/2010 | Fisher et al. |
| 2010/0313409 A1 | 12/2010 | Weber et al. |
| 2011/0005845 A1 | 1/2011 | Hotelling et al. |
| 2013/0135195 A1* | 5/2013 | Josephson et al. ............ 345/156 |
| 2013/0271422 A1* | 10/2013 | Hotelling et al. ............ 345/174 |
| 2013/0307818 A1* | 11/2013 | Pope et al. .................... 345/174 |

FOREIGN PATENT DOCUMENTS

| | | |
|---|---|---|
| CN | 1499356 | 5/2004 |
| CN | 1659506 | 8/2005 |
| DE | 3615742 | 11/1987 |
| DE | 19722636 | 12/1998 |
| DE | 10022537 | 11/2000 |
| DE | 20019074 | 2/2001 |
| DE | 10 2004 043 663 | 4/2006 |
| EP | 0178157 | 4/1986 |
| EP | 0419145 | 3/1991 |
| EP | 0 498 540 | 8/1992 |
| EP | 0 521 683 | 1/1993 |
| EP | 0 674 288 | 9/1995 |
| EP | 0 731 407 | 9/1996 |
| EP | 0 551 778 | 1/1997 |
| EP | 0 880 091 | 11/1998 |
| EP | 1 026 713 | 8/2000 |
| EP | 1 081 922 | 3/2001 |
| EP | 1 098 241 | 5/2001 |
| EP | 1 133 057 | 9/2001 |
| EP | 1 162 826 | 12/2001 |
| EP | 1 168 396 | 1/2002 |
| EP | 1 205 836 | 5/2002 |
| EP | 1 244 053 | 9/2002 |
| EP | 1 251 455 | 10/2002 |
| EP | 1 263 193 | 12/2002 |
| EP | 1 347 481 | 9/2003 |
| EP | 1 376 326 | 1/2004 |
| EP | 1 467 392 | 10/2004 |
| EP | 1 482 401 | 12/2004 |
| EP | 1 496 467 | 1/2005 |
| EP | 1 517 228 | 3/2005 |
| EP | 1 542 437 | 6/2005 |
| EP | 1 589 407 | 10/2005 |
| EP | 1 784 058 | 5/2007 |
| EP | 1 841 188 | 10/2007 |
| EP | 1 850 218 | 10/2007 |
| EP | 1 876 711 | 1/2008 |
| FR | 2 686 440 | 7/1993 |
| GB | 2015167 | 9/1979 |
| GB | 2072389 | 9/1981 |
| GB | 2315186 | 1/1998 |
| GB | 2333215 | 7/1999 |
| GB | 2391060 | 1/2004 |
| GB | 2402105 | 12/2004 |
| JP | 57-95722 | 6/1982 |
| JP | 57-97626 | 6/1982 |
| JP | 61-117619 | 6/1986 |
| JP | 61-124009 | 6/1986 |
| JP | 63-20411 | 1/1988 |
| JP | 63-106826 | 5/1988 |
| JP | 63-181022 | 7/1988 |
| JP | 63-298518 | 12/1988 |
| JP | 03-57617 | 6/1991 |
| JP | 3-192418 | 8/1991 |
| JP | 4-32920 | 2/1992 |
| JP | 4-205408 | 7/1992 |
| JP | 5-041135 | 2/1993 |
| JP | 5-080938 | 4/1993 |
| JP | 5-101741 | 4/1993 |
| JP | 5-36623 | 5/1993 |
| JP | 5-189110 | 7/1993 |
| JP | 5-205565 | 8/1993 |
| JP | 5-211021 | 8/1993 |
| JP | 5-217464 | 8/1993 |
| JP | 5-233141 | 9/1993 |
| JP | 5-262276 | 10/1993 |
| JP | 5-265656 | 10/1993 |
| JP | 5-274956 | 10/1993 |
| JP | 5-289811 | 11/1993 |
| JP | 5-298955 | 11/1993 |
| JP | 5-325723 | 12/1993 |
| JP | 6-20570 | 1/1994 |
| JP | 6-084428 | 3/1994 |
| JP | 6-089636 | 3/1994 |
| JP | 6-96639 | 4/1994 |
| JP | 6-111695 | 4/1994 |
| JP | 6-139879 | 5/1994 |

(56) References Cited

FOREIGN PATENT DOCUMENTS

| | | |
|---|---|---|
| JP | 6-187078 | 7/1994 |
| JP | 6-208433 | 7/1994 |
| JP | 6-267382 | 9/1994 |
| JP | 6-283993 | 10/1994 |
| JP | 6-333459 | 12/1994 |
| JP | 7-107574 | 4/1995 |
| JP | 7-41882 | 7/1995 |
| JP | 7-201249 | 8/1995 |
| JP | 7-201256 | 8/1995 |
| JP | 7-253838 | 10/1995 |
| JP | 7-261899 | 10/1995 |
| JP | 7-261922 | 10/1995 |
| JP | 7-296670 | 11/1995 |
| JP | 7-319001 | 12/1995 |
| JP | 8-016292 | 1/1996 |
| JP | 8-115158 | 5/1996 |
| JP | 8-203387 | 8/1996 |
| JP | 8-293226 | 11/1996 |
| JP | 8-298045 | 11/1996 |
| JP | 8-299541 | 11/1996 |
| JP | 8-316664 | 11/1996 |
| JP | 9-044289 | 2/1997 |
| JP | 9-069023 | 3/1997 |
| JP | 9-128148 | 5/1997 |
| JP | 9-134248 | 5/1997 |
| JP | 9-218747 | 8/1997 |
| JP | 9-230993 | 9/1997 |
| JP | 9-231858 | 9/1997 |
| JP | 9-233161 | 9/1997 |
| JP | 9-251347 | 9/1997 |
| JP | 9-258895 | 10/1997 |
| JP | 9-288926 | 11/1997 |
| JP | 9-512979 | 12/1997 |
| JP | 10-63467 | 3/1998 |
| JP | 10-74127 | 3/1998 |
| JP | 10-074429 | 3/1998 |
| JP | 10-198507 | 7/1998 |
| JP | 10-227878 | 8/1998 |
| JP | 10-240693 | 9/1998 |
| JP | 10-320322 | 12/1998 |
| JP | 10-326149 | 12/1998 |
| JP | 11-24834 | 1/1999 |
| JP | 11-184607 | 7/1999 |
| JP | 11-194863 | 7/1999 |
| JP | 11-194872 | 7/1999 |
| JP | 11-194882 | 7/1999 |
| JP | 11-194883 | 7/1999 |
| JP | 11-194891 | 7/1999 |
| JP | 11-195353 | 7/1999 |
| JP | 11-203045 | 7/1999 |
| JP | 11-212725 | 8/1999 |
| JP | 11-272378 | 10/1999 |
| JP | 11-338628 | 12/1999 |
| JP | 2000-200147 | 7/2000 |
| JP | 2000-215549 | 8/2000 |
| JP | 2000-267777 | 9/2000 |
| JP | 2000-267786 | 9/2000 |
| JP | 2000-267797 | 9/2000 |
| JP | 2000-353045 | 12/2000 |
| JP | 2001-11769 | 1/2001 |
| JP | 2001-22508 | 1/2001 |
| JP | 2001-184158 | 7/2001 |
| JP | 3085481 | 2/2002 |
| JP | 2002-215311 | 8/2002 |
| JP | 2003-015796 | 1/2003 |
| JP | 2003-060754 | 2/2003 |
| JP | 2003-099198 | 4/2003 |
| JP | 2003-150303 | 5/2003 |
| JP | 2003-517674 | 5/2003 |
| JP | 2003-280799 | 10/2003 |
| JP | 2003-280807 | 10/2003 |
| JP | 2004-362097 | 12/2004 |
| JP | 2005-251218 | 9/2005 |
| JP | 2005-285140 | 10/2005 |
| JP | 2005-293606 | 10/2005 |
| JP | 2006-004453 | 1/2006 |
| JP | 2006-178962 | 7/2006 |
| JP | 3852854 | 12/2006 |
| JP | 2007-123473 | 5/2007 |
| KR | 1998-71394 | 10/1998 |
| KR | 1999-50198 | 7/1999 |
| KR | 2000-0008579 | 2/2000 |
| KR | 2001-0052016 | 6/2001 |
| KR | 2001-108361 | 12/2001 |
| KR | 2002-65059 | 8/2002 |
| KR | 10-2006-0021678 | 3/2006 |
| TW | 431607 | 4/2001 |
| TW | 00470193 | 12/2001 |
| TW | 547716 | 8/2003 |
| TW | I220491 | 8/2004 |
| WO | WO-94/17494 | 8/1994 |
| WO | WO-95/00897 | 1/1995 |
| WO | WO-96/27968 | 9/1996 |
| WO | WO-98/14863 | 4/1998 |
| WO | WO-99/49443 | 9/1999 |
| WO | WO-00/79772 | 12/2000 |
| WO | WO-01/02949 | 1/2001 |
| WO | WO-01/44912 | 6/2001 |
| WO | WO-02/08881 | 1/2002 |
| WO | WO-03/025960 | 3/2003 |
| WO | WO-03/044645 | 5/2003 |
| WO | WO-03/044956 | 5/2003 |
| WO | WO-03/088176 | 10/2003 |
| WO | WO-03/090008 | 10/2003 |
| WO | WO-2004/001573 | 12/2003 |
| WO | WO-2004/040606 | 5/2004 |
| WO | WO-2004/091956 | 10/2004 |
| WO | WO-2005/055620 | 6/2005 |
| WO | WO-2005/076117 | 8/2005 |
| WO | WO-2005/114369 | 12/2005 |
| WO | WO-2005/124526 | 12/2005 |
| WO | WO-2006/020305 | 2/2006 |
| WO | WO-2006/021211 | 3/2006 |
| WO | WO-2006/037545 | 4/2006 |
| WO | WO 2006/104745 | 10/2006 |
| WO | WO-2006/135127 | 12/2006 |
| WO | WO-2007/025858 | 3/2007 |
| WO | WO-2007/078477 | 7/2007 |
| WO | WO-2007/084467 | 7/2007 |
| WO | WO-2007/089766 | 8/2007 |
| WO | WO-2008/007372 | 1/2008 |
| WO | WO-2008/045414 | 4/2008 |
| WO | WO-2008/045833 | 4/2008 |

OTHER PUBLICATIONS

Ahl, David, "Controller Update," Creative Computing Vo. 9, No. 12, Dec. 1983.

Ahmad, "A Usable Real-Time 3D Hand Tracker," Proceedings of the 28th Asilomar Conference on Signals, Systems and Computers—Part 2 (of 2) vol. 2 (Oct. 1994).

"Alps Electric Ships GlidePoint Keyboard for the Macintosh; Includes a GlidePoint Touchpad, Erase-Eaze Backspace Key and Contoured Wrist Rest," Business Wire (Jul. 1, 1996).

"Alps Electric introduces the GlidePoint Wave Keyboard; combines a gently curved design with Alps' advanced GlidePoint Technology," Business Wire (Oct. 21, 1996).

"Apple Presents iPod: Ultra-Portable MP3 Music Player Puts 1,000 Songs in Your Pocket," retreived from http://www.apple.com/pr/library/2001/oct/23ipod.html on Oct. 23, 2001.

"Apple Unveils Optical Mouse and New Pro Keyboard," Press Release, Jul. 19, 2000.

"APS show guide to exhibitors," Physics Today 49(3) (Mar. 1996).

"Atari VCS/2600 Peripherals," www.classicgaming.com/gamingmuseum/2006p.html, downloaded Feb. 28, 2007, pp. 1-15.

Baig, E.C., "Your PC Just Might Need a Mouse," U.S. News & World Report 108(22) (Jun. 4, 1990).

Bang & Olufsen Telecom a/s. (2000). BeoCom 6000 User Guide; 53 pages.

Bartimo, Jim, "The Portables: Travelling Quickly," Computerworld (Nov. 14, 1983).

(56) References Cited

OTHER PUBLICATIONS

Boling, Douglas (1993) "Programming Microsoft Windows CE.NET," p. 109.
Bray, "Phosphors help switch on xenon," Physics in Action, pp. 1-3, Apr. 1999.
Brink et al., "Pumped-up portables," U.S. News & World Report 116(21) (May 30, 1994).
Brown et al., "Windows on Tablets as a Means of Achieving Virtual Input Devices," Human-Computer Interaction—INTERACT '90 (1990).
Buxton et al., "Issues and Techniques in Touch-Sensitive Tablet Input," Computer Graphics 19(3), Proceedings of SIGGRAPH '85 (1985).
Chapweske, Adam "PS/2 Mouse/Keyboard Protocol," 1999, http://panda.cs.ndsu.nodak.edu/~achapwes/PICmicro/PS2/ps2.htm.
Chen et al., "A Study in Interactive 3-D Rotation Using 2-D Control Devices," Computer Graphics 22(4) (Aug. 1988).
De Meyer, Kevin, "Crystal Optical Mouse," Feb. 14, 2002, Heatseekerz, Web Article 19.
"Der Klangmeister," Connect Magazine, Aug. 1998.
"Design News literature plus," Design News 51(24) (Dec. 18, 1995).
"Diamond Multimedia Announces Rio PMP300 Portable MP3 Music Player," located at http://news.harmony-central.com/Newp/1998/Rio-PMP300.html visited on May 5, 2008. (4 pages).
Evans et al., "Tablet-based Valuators that Provide One, Two, or Three Degrees of Freedom," Computer Grahics 15(3) (Aug. 1981).
EVB Elektronik "TSOP6238 IR Receiver Modules for Infrared Remote Control Systems" dated Jan. 2004 1 page.
Fiore, "Zen Touchpad," Cornell University, May 2000.
Gadgetboy, "Point and click with the latest mice," CNET Asia Product Review, www.asia.cnet.com/reviews...are/gadgetboy/0,39001770,380235900,00.htm, downloaded Dec. 5, 2001.
Gfroerer, "Photoluminescence in Analysis of Surfaces and Interfaces," Encyclopedia of Analytical Chemistry, pp. 1-23, Copyright John Wiley & Sons Ltd, Chichester, 2000.
Interlink Electronics, VersaPad: Integration Guide, © 1998 (VersaPad), pp. 1-35.
Jesitus, John, "Broken promies?", Industry Week/IW 246(20) (Nov. 3, 1997).
Kobayashi (1996) "Design of Dynamic Soundscape: Mapping Time to Space for Audio Browsing with Simultaneous Listening," Thesis submitted to Program in Media Arts and Sciences at the Massachusetts Institute of Technology, (58 pages).
Kobayashi et al. (1994) "Development of the Touch Switches with the Click Response," Koukuu Denshi Gihou No. 17, pp. 44-48 (published by the Japan Aviation Electronics Industry, Ltd.).
Kobayashi et al. (1997) "Dynamic Soundscape: Mapping Time to Space for Audio Browsing," Computer Human Interaction: 16 pages.
Letter re: Bang & Olufsen a/s by David Safran, Nixon Peabody, LLP, May 21, 2004, with BeoCom 6000 Sales Training Brochure, 7 pages.
Luna Technologies International, Inc., LUNA Photoluminescent Safety Products, "Photoluminescence—What is Photoluminescence?" from website at http://www.lunaplast.com/photoluminescence.com on Dec. 27, 2005.
"Manufactures," Laser Focus World, Buyers Guide '96, 31(12) (Dec. 1995).
Mims, Forrest M., III, "A Few Quick Pointers; Mouses, Touch Screens, Touch Pads, Light Pads, and the Like Can Make System Easier to Use," Computers & Electronics (22) (May 1984).
Nass, Richard, "Touchpad input device goes digital to give portable systems a desktop 'mouse-like' feel," Electronic Design 44(18) (Sep. 3, 1996).
"National Design Engineering Show," Design News 52(5) (Mar. 4, 1996).
"Neuros MP3 Digital Audio Computer," www.neurosaudio.com, downloaded Apr. 9, 2003.
"OEM Touchpad Modules" website www.glidepoint.com/sales/modules.index.shtml, downloaded Feb. 13, 2002.
Perenson, Melissa, "New & Improved: Touchpad Redux," PC Magazine (Sep. 10, 1996).
Petersen, Marty, "Koala Pad Touch Tablet & Micro Illustrator Software," InfoWorld (Oct. 10, 1983).
Petruzzellis, "Force-Sensing Resistors," Electronics Now 64(3) (Mar. 1993).
Photographs of Innovation 2000 Best of Show Award Presented at the 2000 Int'l CES Innovations Design & Engineering Showcase, Jan. 6, 2000, 1 page.
"Preview of exhibitor booths at the Philadelphia show," Air Conditioning, Heating & News 200(2) (Jan. 13, 1997).
"Product news," Design News 53(11) (Jun. 9, 1997).
"Product news," Design News 53(9) (May 5, 1997).
"Product Overview—ErgoCommander®," www.logicad3d.com/products/ErgoCommander.htm, downloaded Apr. 8, 2002.
"Product Overview—SpaceMouse® Classic," www.logicad3d.com/products/Classic.htm, downloaded Apr. 8, 2002.
SanDisk Sansa Connect User Guide, 2007; 29 pages.
Soderholm, Lars G., "Sensing Systems for 'Touch and Feel,'" Design News (May 8, 1989): pp. 72-76.
Sony presents "Choice Without Compromise" at IBC '97 M2 Presswire (Jul. 24, 1997).
Spiwak, Marc, "A Great New Wireless Keyboard," Popular Electronics 14(12) (Dec. 1997).
Spiwak, Marc, "A Pair of Unusual Controllers," Popular Electronics 14(4) (Apr. 1997).
Sylvania, "Intellvision™ Intelligent Television Master Component Service Manual," pp. 1, 2 and 8, 1979.
"Synaptics Tough Pad Interfacing Guide," Second Edition, Mar. 25, 1998, Synaptics, Inc., San Jose, CA, pp. 1-90.
"System Service and Troubleshooting Manual," www.dsplib.com/intv/Master, downloaded Dec. 11, 2002.
Tessler, Franklin, "Point Pad," Macworld 12(10) (Oct. 1995).
Tessler, Franklin, "Smart Input: How to Chose from the New Generation of Innovative Input Devices," Macworld 13(5) (May 1996).
Tessler, Franklin, "Touchpads," Macworld 13(2) (Feb. 1996).
Translation of Trekstor's Defense Statement to the District Court Mannheim of May 23, 2008; 37 pages.
"Triax Custom Controllers due; Video Game Controllers," HFD—The Weekly Home Furnishing Newspaper 67(1) (Jan. 4, 1993).
"Touchpad," Notebook PC Manual, Acer Information Co. Ltd., Feb. 16, 2005, pp. 11-12.
Beaver et al., U.S. Appl. No. 12/042,318, filed Mar. 4, 2008 entitled, "Touch Event Model"; 36 pages.
Robbin, U.S. Appl. No. 60/346,237 entitled, "Method and System for List Scrolling," filed Oct. 22, 2001.
Zadesky et al., U.S. Appl. No. 60/359,551 entitled "Touchpad for Handheld Device," filed Feb. 25, 2002.
Robbin et al., U.S. Appl. No. 60/387,692 entitled "Method and Apparatus for Use of Rotational User Inputs," filed Jun. 10, 2002.
Robbin et al., U.S. Appl. No. 60/399,806 entitled "Graphical User Interface and Methods of Use Thereof in a Multimedia Player," filed Jul. 30, 2002.
Grignon et al., U.S. Appl. No. 60/755,656, filed Dec. 30, 2005, entitled "Touch Pad with Feedback".
Elias et al., U.S. Appl. No. 60/522,107, filed Aug. 16, 2004, entitled, "A Method for Increasing the Spatial Resolution of Touch Sensitive Devices".
Hotelling, U.S. Appl. No. 60/658,777 titled "Multi-Functional Handheld Device," filed Mar. 4, 2005.
Zadesky et al., U.S. Appl. No. 60/714,609 entitled "Scrolling Input Arrangements Using Capacitive Sensors on a Flexible Membrane," filed Sep. 6, 2005.
Lampell et al., U.S. Appl. No. 60/810,423, filed Jun. 2, 2006, entitled "Techniques for Interactive Input to Portable Electronic Devices".
Prest et al., U.S. Appl. No. 60/850,662, filed Oct. 11, 2006, entitled, "Capacitive Scroll Wheel".
Bollinger, U.S. Appl. No. 60/858,404, filed Nov. 13, 2006, entitled "Method of Capacitively Sensing Finger Position".
Rothkopf, U.S. Appl. No. 60/935,854 titled "Compact Media Players," filed Sep. 4, 2007.
Rathnam et al., U.S. Appl. No. 60/992,056, filed Dec. 3, 2007, entitled, "Scroll Wheel Circuit Arrangements and Methods of Use Thereof".

(56) References Cited

OTHER PUBLICATIONS

Rathnam et al., U.S. Appl. No. 61/017,436, filed Dec. 28, 2007, entitled, "Multi-Touch Scroll Wheel Circuit Arrangements and Processing Methods".
Weber et al., U.S. Appl. No. 61/020,531, filed Jan. 11, 2008 entitled "Modifiable Clickwheel Text"; 11 pages.
Weber et al., U.S. Appl. No. 61/025,531, filed Feb. 1, 2008 entitled "Co-Extruded Materials and Methods"; 11 pages.
Fisher et al., U.S. Appl. No. 61/036,804, filed Mar. 14, 2008 entitled "Switchable Sensor Configurations"; 46 pages.
International Search Report and Written Opinion mailed Oct. 19, 2009, directed to PCT/US2008/085137; 15 pages.
IPRP mailed Jun. 8, 2010 directed to counterpart PCT/US2008/085137; 10 pages.
CN Office Action issued Dec. 29, 2006, directed to CN Application No. 200510103886.3, 25 pages.
Tsuk et al., U.S. Office Action mailed Oct. 13, 2006, directed to U.S. Appl. No. 10/256,716; 16 pages.
Tsuk et al., U.S. Office Action mailed Aug. 3, 2006, directed to U.S. Appl. No. 10/256,716; 15 pages.
Tsuk et al., U.S. Office Action mailed Jan. 10, 2006, directed to U.S. Appl. No. 10/256,716; 12 pages.
Tsuk et al., U.S. Office Action mailed Jun. 24, 2005, directed to U.S. Appl. No. 10/256,716; 12 pages.
Tsuk et al., U.S. Office Action mailed Sep. 30, 2004, directed to U.S. Appl. No. 10/256,716; 11 pages.
Tsuk et al., U.S. Office Action mailed Aug. 7, 2009, directed to U.S. Appl. No. 11/610,181; 20 pages.
Tsuk et al., U.S. Office Action mailed Jul. 7, 2009, directed to U.S. Appl. No. 11/610,190; 24 pages.
Tsuk et al., U.S. Office Action mailed Dec. 31, 2009, directed to U.S. Appl.No. 11/610,190; 25 pages.
Tsuk et al., U.S. Office Action mailed Apr. 28, 2010, directed to U.S. Appl. No. 11/610,190; 29 pages.
Tsuk et al., U.S. Office Action mailed Aug. 6, 2010, directed to U.S. Appl. No. 11/610,190; 30 pages.
Tsuk et al., U.S. Office Action mailed Apr. 19, 2011, directed to U.S. Appl. No. 11/610,190; 25 pages.
Tsuk et al., U.S. Office Action mailed Nov. 1, 2010, directed to U.S. Appl. No. 11/959,918; 8 pages.
Tsuk et al., U.S. Office Action mailed Mar. 31, 2011, directed to U.S. Appl. No. 11/959,918; 9 pages.
Tsuk et al., U.S. Office Action mailed Oct. 26, 2010, directed to U.S. Appl. No. 11/959,942; 27 pages.
Robbin et al., U.S. Office Action mailed Jan. 18, 2007, directed to U.S. Appl. No. 10/259,159; 18 pages.
Robbin et al., U.S. Office Action mailed Oct. 13, 2006, directed to U.S. Appl. No. 10/259,159; 18 pages.
Robbin et al., U.S. Office Action mailed Aug. 3, 2006, directed to U.S. Appl. No. 10/259,159; 15 pages.
Robbin et al., U.S. Office Action mailed Jan. 11, 2006, directed to U.S. Appl. No. 10/259,159; 15 pages.
Robbin et al., U.S. Office Action mailed Jun. 16, 2005, directed to U.S. Appl. No. 10/259,159; 16 pages.
Robbin et al., U.S. Office Action mailed Sep. 30, 2004, directed to U.S. Appl. No. 10/259,159; 14 pages.
Robbin et al., U.S. Office Action mailed Aug. 10, 2009, directed to U.S. Appl. No. 11/610,376; 11 pages.
Robbin et al., U.S. Office Action mailed Aug. 12, 2009, directed to U.S. Appl. No. 11/610,384; 20 pages.
Robbin et al., U.S. Office Action mailed Oct. 29, 2010, directed to U.S. Appl. No. 11/838,845; 8 pages.
Robbin et al., U.S. Office Action mailed Apr. 26, 2011, directed to U.S. Appl. No. 11/838,845; 9 pages.
Zadesky et al., U.S. Office Action mailed Jul. 9, 2008, directed to U.S. Appl. No. 10/643,256; 12 pages.
Zadesky et al., U.S. Office Action mailed Dec. 12, 2007, directed to U.S. Appl. No. 10/643,256; 12 pages.
Zadesky et al., U.S. Office Action mailed Jul. 13, 2007, directed to U.S. Appl. No. 10/643,256; 13 pages.
Zadesky et al., U.S. Office Action mailed Mar. 23, 2007, directed to U.S. Appl. No. 10/643,256; 11 pages.
Zadesky et al., U.S. Office Action mailed Oct. 27, 2006, directed to U.S. Appl. No. 10/643,256; 14 pages.
Zadesky et al., U.S. Office Action mailed Mar. 30, 2010, directed to U.S. Appl. No. 11/592,679; 13 pages.
Zadesky et al., U.S. Office Action mailed Mar. 31, 2011, directed to U.S. Appl. No. 11/882,005; 7 pages.
Ng et al., U.S. Action mailed Jan. 14, 2010, directed to U.S. Appl. No. 11/394,493; 20 pages.
Ng et al., U.S. Office Action mailed Jun. 22, 2010, directed to U.S. Appl. No. 11/394,493; 14 pages.
Ng et al., U.S. Office Action mailed Dec. 9, 2010, directed to U.S. Appl. No. 11/394,493; 13 pages.
Ng et al., U.S. Office Action mailed Jan. 15, 2010, directed to U.S. Appl. No. 11/882,423; 22 pages.
Ng et al., U.S. Office Action mailed Jul. 8, 2010, directed to U.S. Appl. No. 11/882,423; 19 pages.
Ng et al., U.S. Office Action mailed Oct. 26, 2010, directed to U.S. Appl. No. 11/882,423; 18 pages.
Forsblad et al., U.S. Office Action mailed Jun. 25, 2009, directed to U.S. Appl. No. 11/355,022; 18 pages.
Forsblad et al., U.S. Office Action mailed Jan. 26, 2009, directed to U.S. Appl. No. 11/355,022; 15 pages.
Forsblad et al., U.S. Office Action mailed Jan. 27, 2009, directed to U.S. Appl. No. 11/882,421; 15 pages.
Lampell, U.S. Office Action mailed Sep. 15, 2009, directed to U.S. Appl. No. 11/530,807; 15 pages.
Lampell, U.S. Office Action mailed Jun. 4, 2010, directed to U.S. Appl. No. 11/530,807; 15 pages.
Lampell, U.S. Office Action mailed Dec. 3, 2010, directed to U.S. Appl. No. 11/530,807; 17 pages.
Lampell et al., U.S Office Action mailed Dec. 22, 2010, directed to U.S. Appl. No. 11/882,427; 16 pages.
Zadesky et al., U.S. Office Action mailed Aug. 6, 2009, directed to U.S. Appl. No. 11/057,050; 30 pages.
Zadesky et al., U.S. Office Action mailed Feb. 20, 2009, directed to U.S. Appl. No. 11/057,050; 25 pages.
Zadesky et al., U.S. Office Action mailed Dec. 24, 2008, directed to U.S. Appl. No. 11/057,050; 25 pages.
Zadesky et al., U.S. Office Action mailed Nov. 26, 2008, directed to U.S. Appl. No. 11/057,050; 25 pages.
Zadesky et al, U.S. Office Action mailed Aug. 19, 2008, directed to U.S. Appl. No. 11/057,050; 23 pages.
Zadesky et al., U.S. Office Action mailed Nov. 20, 2007, directed to U.S. Appl. No. 11/057,050; 33 pages.
Zadesky et al., U.S. Office Action mailed Oct. 4, 2010, directed to U.S. Appl. No. 11/057,050; 31 pages.
Zadesky et al., U.S. Office Action mailed Mar. 5, 2009, directed to U.S. Appl. No. 11/477,469; 12 pages.
Zadesky et al., U.S. Office Action mailed Feb. 4, 2010, directed to U.S. Appl. No. 11/477,469; 14 pages.
Zadesky et al., U.S. Office Action mailed Nov. 16, 2010, directed to U.S. Appl. No. 11/477,469; 13 pages.
Prest et al., U.S. Office Action mailed Jun. 22, 2010, directed to U.S. Appl. No. 11/878,132; 32 pages.
Prest et al., U.S. Office Action mailed Jun. 22, 2010, directed to U.S. Appl. No. 11/882,882; 32 pages.
Prest et al., U.S. Office Action mailed Jun. 23, 2010, directed to U.S. Appl. No. 11/812,384; 29 pages.
Prest et al., U.S. Office Action mailed Jun. 22, 2010, directed to U.S. Appl. No. 11/882,890; 15 pages.
Prest et al., U.S. Office Action mailed Jun. 22, 2010, directed to U.S. Appl. No. 11/812,383; 21 pages.
Prest et al., U.S. Office Action mailed Jun. 23, 2010, directed to U.S. Appl. No. 11/882,889; 13 pages.
Bollinger et al., U.S. Office Action mailed Jun. 25, 2010, directed to U.S. Appl. No. 11/842,724; 22 pages.
Bollinger et al., U.S. Office Action mailed Mar. 21, 2011, directed to U.S. Appl. No. 11/842,724; 22 pages.
McKillop et al., U.S. Office Action mailed Sep. 16, 2010, directed to U.S. Appl. No. 11/591,752; 14 pages.

(56) References Cited

OTHER PUBLICATIONS

McKillop et al., U.S. Office Action mailed Mar. 24, 2011, directed to U.S. Appl. No. 11/591,752; 11 pages.
Zadesky et al., U.S. Office Action mailed Jul. 30, 2004, directed to U.S. Appl. No. 10/188,182; 7 pages.
Zadesky et al., U.S. Office Action mailed Sep. 21, 2005, directed to U.S. Appl. No. 10/188,182; 10 pages.
Zadesky et al., U.S. Office Action mailed Mar. 4, 2004, directed to U.S. Appl. No. 10/188,182; 8 pages.
Zadesky et al., U.S. Office Action mailed Oct. 4, 2007, directed to U.S. Appl. No. 11/386,238; 12 pages.
Zadesky et al., U.S. Office Action mailed Oct. 4, 2007, directed to U.S. Appl. No. 11/806,957; 14 pages.
Zadesky et al., U.S. Office Action mailed Aug. 2, 2010, directed to U.S. Appl. No. 11/882,004; 9 pages.
Zadesky et al, U.S. Office Action mailed Feb. 1, 2011, directed to U.S. Appl. No. 11/882,004; 16 pages.
Zadesky et al., U.S. Office Action mailed Sep. 29, 2010, directed to U.S. Appl. No. 11/882,003; 13 pages.
Zadesky et al., U.S. Office Action mailed Mar. 16, 2011, directed to U.S. Appl. No. 11/882,003; 12 pages.
Marriott et al., U.S. Office Action mailed Jan. 30, 2008, directed to U.S. Appl. No. 10/722,948; 17 pages.
Marriott et al., U.S. Office Action mailed Jul. 13, 2007, directed to U.S. Appl. No. 10/722,948; 15 pages.
Marriott et al., U.S. Office Action mailed Dec. 12, 2006, directed to U.S. Appl. No. 10/722,948; 14 pages.
Marriott et al., U.S. Office Action mailed Jun. 2, 2006, directed to U.S. Appl. No. 10/722,948; 12 pages.
Marriott et al., U.S. Office Action mailed Aug. 19, 2010, directed to U.S. Appl. No. 11/882,422; 13 pages.
Hotelling, U.S. Office Action mailed Sep. 1, 2009, directed to U.S. Appl. No. 11/482,286; 14 pages.
Hotelling, U.S. Office Action mailed Jan. 25, 2010, directed to U.S. Appl. No. 11/482,286; 17 pages.
Hotelling, U.S. Office mailed Jun. 9, 2010, directed to U.S. Appl. No. 11/482,286; 21 pages.
Hotelling, U.S. Office Action mailed Oct. 1, 2010, directed to U.S. Appl. No. 11/482,286; 28 pages.
Hotelling, U.S. Office Action mailed Dec. 8, 2010, directed to U.S. Appl. No. 11/482,286; 33 pages.
Hotelling, U.S. Office Action mailed Aug. 18, 2010, directed to U.S. Appl. No. 11/882,424; 16 pages.
Hotelling et al., U.S. Office Action mailed Jul. 24, 2009, directed to U.S. Appl. No. 11/483,008; 17 pages.
Hotelling et al., U.S. Office Action mailed Mar. 30, 2010, directed to U.S. Appl. No. 11/483,008; 20 pages.
Hotelling et al., U.S. Office Action mailed Oct. 27, 2010, directed to U.S. Appl. No. 11/483,008; 23 pages.
Hotelling et al., U.S. Office Action mailed Jul. 27, 2009, directed to U.S. Appl. No. 11/882,420; 17 pages.
Elias et al., U.S. Office Action mailed Aug. 4, 2009, directed to U.S. Appl. No. 11/203,692; 12 pages.
Elias et al., U.S. Office Action mailed Feb. 23, 2009, directed to U.S. Appl. No. 11/203,692; 13 pages.
Elias et al., U.S. Office Action mailed Sep. 17, 2008, directed to U.S. Appl. No. 11/203,692; 8 pages.
Elias et al., U.S. Office Action mailed Mar. 30, 2010, directed to U.S. Appl. No. 11/203,692; 15 pages.
Elias et al., U.S. Office Action mailed Jun. 11, 2010, directed to U.S. Appl. No. 11/203,692; 17 pages.
Elias et al., U.S. Office Action mailed Nov. 22, 2010, directed to U.S. Appl. No. 11/203,692; 6 pages.
Bull, U.S. Office Action mailed Jul. 9, 2010, directed to U.S. Appl. No. 11/849,801; 13 pages.
Bull, U.S. Office Action mailed Feb. 4, 2011, directed to U.S. Appl. No. 11/849,801; 22 pages.
Weber et al., U.S. Office Action mailed Jun. 7, 2010, directed to U.S. Appl. No. 11/856,530; 15 pages.
Weber et al, U.S. Office Action mailed Jan. 7, 2011, directed to U.S. Appl. No. 11/856,530; 13 pages.
Rathnam et al., U.S. Office Action mailed Mar. 24, 2011, directed to U.S. Appl. No. 12/205,757; 14 pages.
Rathnam et al., U.S. Office Action mailed Dec. 7, 2011, directed to U.S. Appl. No. 12/205,757; 18 pages.
Weber et al., U.S. Office Action mailed Oct. 13, 2010, directed to U.S. Appl. No. 12/205,795; 15 pages.
Weber et al., U.S. Office Action mailed Jan. 7, 2011, directed to U.S. Appl. No. 12/205,795; 21 pages.
Weber et al., U.S. Office Action mailed Feb. 17, 2011, directed to U.S. Appl. No. 12/844,502; 11 pages.
Lynch et al., U.S. Office Action mailed Oct. 5, 2009, directed to U.S. Appl. No. 11/499,360; 7 pages.
Lynch et al., U.S. Office Action mailed Jan. 27, 2010, directed to U.S. Appl. No. 11/499,360; 8 pages.

\* cited by examiner $$C = \frac{\sum_{i=P_j}^{P_{j+k}} i\, R_i}{\sum_{i=P_j}^{P_{j+k}} R_i}$$

MULTI-DIMENSIONAL SCROLL WHEEL

CROSS REFERENCE TO RELATED APPLICATIONS

This application is a continuation of U.S. patent application Ser. No. 12/205,757, filed Sep. 5, 2008, which claims priority under 35 USC 119(e) to U.S. Provisional Application No. 60/992,056, filed Dec. 3, 2007, and U.S. Provisional Application No. 61/017,436, filed Dec. 28, 2007, the entireties of which are incorporated herein by reference.

FIELD OF THE DISCLOSURE

This relates generally to touch sensitive input devices, and more particularly, to enhanced functionality scroll wheels.

BACKGROUND

Many types of input devices exist for performing operations in consumer electronic devices. One type of input device that has enjoyed popularity in devices such as media players is the touch-based scroll wheel. Touch-based scroll wheels generally use capacitive sensor elements to detect the rotational motion of a user's finger and translate that motion into linear (e.g., horizontal or vertical) movement of a cursor or content on a display screen.

For example, if a user wishes to scroll down through a list of songs displayed on a media player, the user can touch the scroll wheel in a clockwise direction to see a cursor move from song to song down the list. Conversely, if the user wishes to scroll up through the list, the user can touch the scroll wheel in a counter-clockwise direction to see the cursor move from song to song up the list.

Accordingly, scroll wheels have proven useful and convenient for certain applications, such as navigation control using a single point of contact ("single touch" input). However, as consumer electronic devices evolve and provide more applications, it can become challenging to design such applications to operate based on the single touch rotational input detected by scroll wheels as described above.

SUMMARY

To improve the effectiveness of a touch-based scroll wheel, the present disclosure provides multi-touch scroll wheel circuitry capable of sensing input in multiple ways. For example, scroll wheel circuitry can sense a moving object, such as a finger, as it is moved not only in a rotational manner but also in a linear manner across the center of the scroll wheel. The scroll wheel circuitry can also sense more than one object at a time, such as multi-finger touch or motion. In this manner, the scroll wheel circuitry can enable a device to recognize a wider range of input. To be clear, a wheel can be circular, but can also have any shape that enables a closed loop type input.

Rather than having a single region of sensor elements for sensing single touch rotational input, the scroll wheel of the present disclosure can include multiple regions of sensor elements capable of independently or cooperatively, sequentially or simultaneously sensing the position of an object. The sensor elements can be arranged in any manner suitable for sensing varied input events.

For example, the scroll wheel can include an inner region and an outer region of capacitive sensor elements. The inner region can include one or more elements located at or near the center of the scroll wheel, for example, and the outer region can include a plurality of elements arranged around the inner region. The different regions of sensor elements can aid in sensing gestures that traverse the center of the scroll wheel. For example, the different regions of sensor elements can provide several data points for sensing linear motion as it traverses the sensor elements of each region including the center of the scroll wheel.

Applications can be enhanced by the improved range of input enabled by the scroll wheel circuitry. For example, linear motion, such as a swipe across the scroll wheel, can enable an image browsing application to cause images, such as album cover pictures for example, to be transitioned across a screen. Multi-touch input, such as one finger touching an inner region of the scroll and another finger rotating in the outer region, can enable a zooming application to cause a displayed image to be zoomed-in or out, depending on the direction of the rotation for example. A pinching or expanding of a user's fingers can also enable the zooming application to cause a zooming action.

The scroll wheel circuitry can also bias the sensor element configuration according to the type of input event expected. For example, if a particular application permits only linear motion input along a particular axis (e.g., a horizontal or vertical swipe), the scroll wheel circuitry can utilize only the sensor elements arranged along that path to sense for an input event. By using less than all available sensor elements in this manner, the scroll wheel circuitry can achieve power savings.

By sensing input from at least some of the inner region sensor elements and outer region sensor elements, an angular and/or radial position of one or more of a user's fingers can be determined with relatively high accuracy.

DETAILED DESCRIPTION

The present disclosure describes scroll wheels that can sense and resolve positions of one or more objects (e.g., fingers) as they touch the scroll wheel in a rotational, linear or other manner. According to one aspect of the disclosure, a scroll wheel can be provided on an electronic device to facilitate user interaction therewith.

The present disclosure will now be described in detail with reference to a few embodiments as illustrated in the accompanying drawings. In the following description, numerous specific details are set forth in order to provide a thorough understanding of the present disclosure. It will be apparent, however, to one skilled in the art, that the present disclosure may be practiced without some or all of these specific details. In other instances, well known process steps have not been described in detail in order not to unnecessarily obscure the present disclosure.

Figure 1:
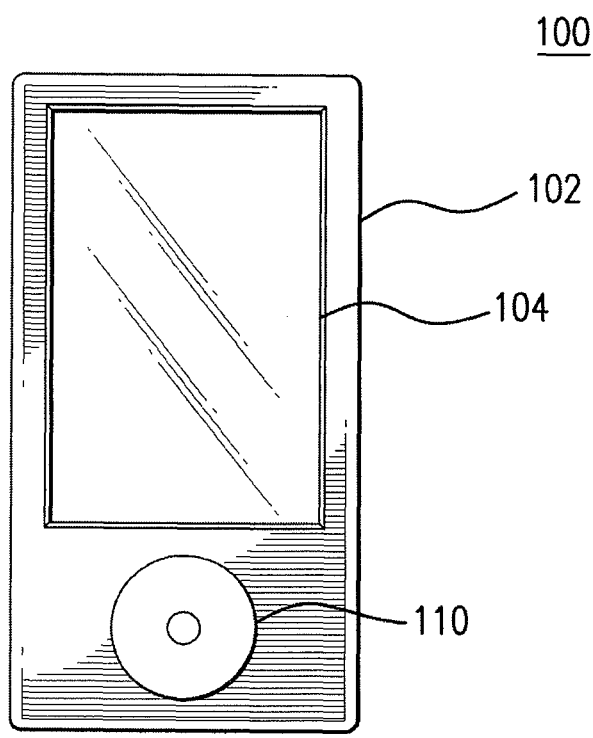
FIG. 1 illustrates an example of an electronic device.

FIG. 1 illustrates an example of an electronic device. The electronic device may be any consumer electronic product. The electronic device may be a computing device and more particularly it may be a media player, PDA, phone, remote control, camera and the like. In the embodiment illustrated in FIG. 1, the electronic device 100 may correspond to a media player. The term "media player" generally refers to computing devices dedicated to processing media such as audio, video or other images, including, for example, music players, game players, video players, video recorders and the like. These devices can be portable to allow a user to, for example, listen to music, play games or video, record video or take pictures wherever the user travels. In one embodiment, the electronic device can be a handheld device that is sized for placement into a pocket of the user. By being pocket sized, the device may be taken almost anywhere the user travels (e.g., the user is not limited by carrying a large, bulky and often heavy device, as in a portable computer). Furthermore, the device can be operated in the user's hands, thus no reference surface such as a desktop is required.

Electronic devices (e.g., media players) generally have connection capabilities that allow a user to upload and download data to and from a host device, such as a general purpose computer (e.g., desktop computer, portable computer, etc.). For example, in the case of a camera, photo images can be downloaded to the general purpose computer for further processing (e.g., printing). With regard to music players, for example, songs and play lists stored on the general purpose computer can be downloaded into the music player. In the embodiment illustrated in FIG. 1, electronic device 100 can be a pocket-sized hand-held media player (e.g., MP3 player) that allows a user to store a collection of music, photos, album art, contacts, calendar entries, and other desirable media assets. It should be appreciated however, that media players are not a limitation as the electronic device may be embodied in other forms as mentioned above.

As shown in FIG. 1, electronic device 100 may include housing 102 that can enclose various electrical components, such as integrated circuit chips and other circuitry, for example. The integrated circuit chips and other circuitry may include, for example, a microprocessor, memory (e.g., ROM, RAM), a power supply (e.g., battery), a circuit board, a hard drive or Flash (e.g., Nand flash) for storing media for example, one or more orientation detection elements (e.g., accelerometer) and various input/output (I/O) support circuitry. In the case of music players, the electrical components can include components for outputting music such as an amplifier and a digital signal processor (DSP) for example. In the case of video recorders or cameras the electrical components can include components for capturing images such as image sensors (e.g., charge coupled device (CCD) or complimentary oxide semiconductor (CMOS)) or optics (e.g., lenses, splitters, filters) for example. In addition to the above, the housing can also define the shape or form of the electronic device. That is, the contour of housing 102 may embody the outward physical appearance of electronic device 100 in one embodiment.

Electronic device 100 may also include display screen 104. Display screen 104 can be used to display a graphical user interface as well as other information to the user (e.g., text, objects, graphics). By way of example, display screen 104 may be a liquid crystal display (LCD). In one embodiment, the display screen can correspond to a X-by-Y pixel high-resolution display, with a white LED backlight to give clear visibility in daylight as well as low-light conditions. Display screen 104 can also exhibit a "wide screen" aspect ratio (e.g., similar to a 16:9 aspect ratio) such that it may be relatively easy to perceive portrait and landscape orientations. In other embodiments, electronic device 100 does not include display screen 104. The lack of display screen 104 can allow electronic device 100 to be configured with smaller dimensions than it would otherwise have with display screen 104. For example, in one embodiment, electronic device 100 without display screen 104 may be less than two inches wide and less than two inches tall.

Electronic device 100 may also include input device 110. Input device 110 can be configured to provide one or more control functions for controlling various applications associated with electronic device 100. For example, a control function can be used to move an object or perform an action on display screen 104 or to make selections or issue commands associated with operating electronic device 100. Input device 110 may be widely varied. In one embodiment, input device 110 can include a rigid sensor mechanism for detecting input. The rigid sensor mechanism can include, for example, a touch sensitive surface that provides location information for an object, such as a finger for example, in contact with or in proximity to the touch sensitive surface. In another embodiment, input device 110 can include one or more movable sensor mechanisms for detecting input. The movable sensor mechanism can include, for example, one or more moving members that actuate a switch when a particular area of input device 110 is pressed. The movable sensor mechanism may operate as a mechanical push button and perform a clicking action when actuated. In a further embodiment, input device 110 may include a combination of a rigid sensor mechanism and one or more movable sensor mechanisms.

An example of an input device comprising a rigid sensor mechanism may be found in U.S. Pat. No. 7,046,230 entitled "Touch Pad Handheld Device," which is incorporated herein by reference in its entirety. An example of an input device comprising a combination of a rigid sensor mechanism and a movable sensor mechanism may be found in U.S. patent application Ser. No. 11/812,383 entitled "Gimballed Scroll Wheel," filed Jun. 18, 2007, which is incorporated herein by reference in its entirety.

FIGS. 2-7 illustrate examples of some arrangements of capacitive sensor elements that can be configured to sense touch events caused by an object, such as a finger, in contact with or in proximity to a touch sensitive surface of input device 110. Touch events detectable by the capacitive sensor elements of input device 110 may be widely varied, and may include, for example, rotational motion, linear motion, taps, holds, and other gestures and any combinations thereof provided by one (single touch input) or more than one (multi-touch input) of a user's fingers across the touch sensitive surface. The capacitive sensor elements can be configured to detect input based on self capacitance (as illustrated in FIGS. 2-7) or mutual capacitance. In self capacitance, the "self" capacitance of a single electrode is measured as for example relative to ground. In mutual capacitance, the mutual capacitance between at least first and second electrodes is measured. In either case, each of the sensor elements can work independent of the other sensor elements to produce simultaneously occurring signals representative of different points of input on the touch sensitive surface at a particular time. Input device 110 can include a controller configured to detect input sensed by the sensor elements by measuring a change in capacitance of the sensor elements.

An example of an input device configured to detect multiple simultaneous touches or near touches may be found in U.S. patent application Ser. No. 10/840,862 entitled "Multipoint Touchscreen," filed May 6, 2004, which is incorporated herein by reference in its entirety. An example of a touch event model that can be associated with such an input device may be found in U.S. patent application Ser. No. 12/042,318 entitled "Touch Event Model," filed Mar. 4, 2008, which is incorporated herein by reference in its entirety. An example of gestures that may be implemented on such an input device may be found in U.S. patent application Ser. No. 11/818,342 entitled "Gestures for Controlling, Manipulating, and Editing of Media Files Using Touch Sensitive Devices," filed Jun. 13, 2007, which is incorporated herein by reference in its entirety.

The present disclosure is not limited to the input device configurations illustrated herein. Rather, an input device of any suitable technology or configuration for enabling detection of input in accordance with the teachings of the present disclosure can be utilized.

Rather than having a single region of sensor elements for sensing single touch rotational input, input device 110 can include multiple regions of sensor elements capable of independently or cooperatively, sequentially or simultaneously sensing an object.

The sensor elements of input device 110 can be arranged in any manner suitable for sensing varied types of input. For example, input device 110 can include an inner region and an outer region of capacitive sensor elements. The inner region can include one or more elements located at or near the center of the input device, for example, and the outer region can include a plurality of elements arranged around the inner region. The different regions of sensor elements can aid in sensing gestures that traverse the center of the input device. For example, the different regions of sensor elements can provide several data points for sensing linear motion as it traverses the sensor elements of each region including the center of the input device.

Input device 110 can enhance the detection of input that can be characterized as linear or non-linear. For example, a linear input can involve a substantially straight-line application of an object (e.g., finger) across the input device. Input device 110 can also be configured to permit detection of multi-touch events—the detection of two or more objects (e.g., fingers) on the input device simultaneously, or nearly simultaneously. It is understood that rotational touch events and touch events comprising any gestural pattern can also be detected with input device 110.

Figure 2:
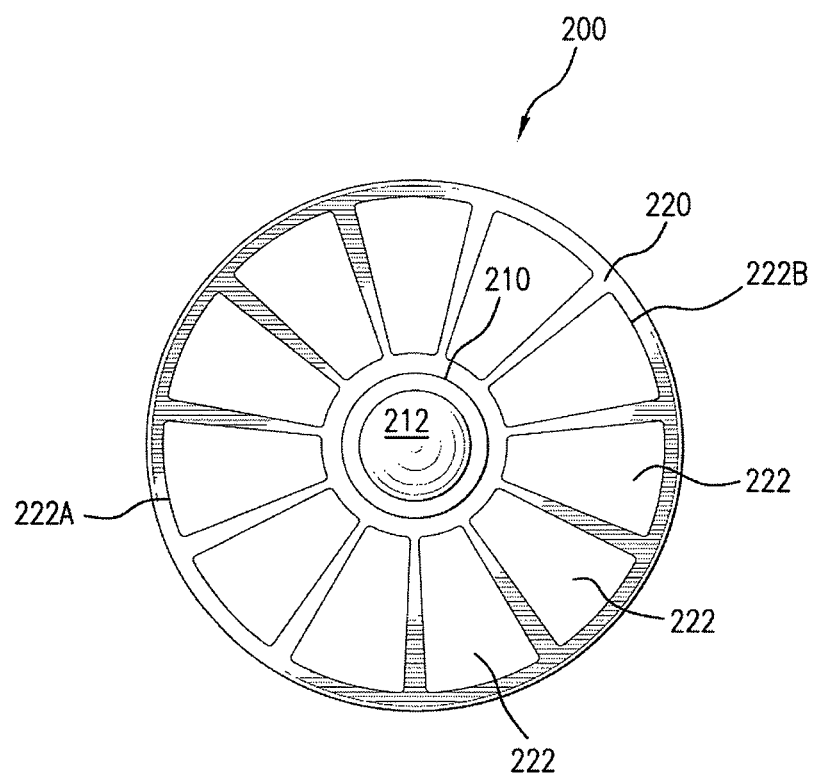
FIG. 2 illustrates an example of a capacitive sensor element arrangement.

FIG. 2 illustrates capacitive sensor element arrangement 200 in accordance with one embodiment. In the embodiment illustrated in FIG. 2, input device 110 can include inner region 210, shown as a circle, and outer region 220 which makes up the periphery of the input device. Inner region 210 includes capacitive sensor element 212. Outer region 220 can include several capacitive sensor elements 222. Including sensor element 212 in the center can provide an extra data point to assist in the detection of gestures that traverse the center of the input device, such as linear input. For example, if a user swipes left-to-right across arrangement 200, each of elements 222A, 212, and 222B can be utilized to detect the gesture. Processing circuitry (not shown) can process this data and determine that the user swiped from left-to-right.

Figure 3:
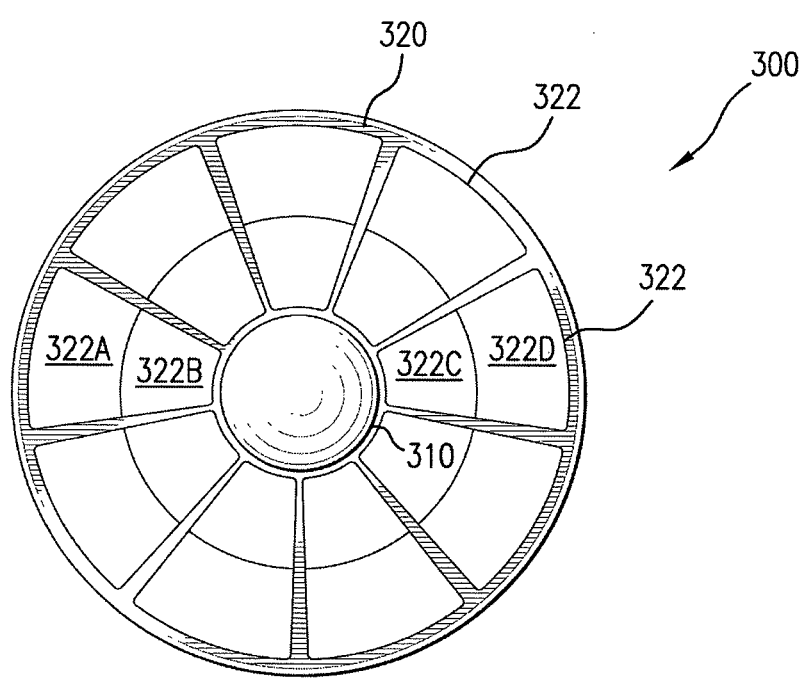
FIG. 3 illustrates an example of a capacitive sensor element arrangement.

FIG. 3 illustrates capacitive sensor element arrangement 300 in accordance with one embodiment. In the embodiment illustrated in FIG. 3, input device 110 can include inner region 310 and outer region 320. Inner region 310 can be devoid of or optionally include a capacitive sensor element. Outer region 320 can include several multi-element capacitive sensing areas 322 that include more than one capacitive sensor element capable of independently or cooperatively sensing an object. Sensing areas 322 can provide additional data points to assist the processing circuitry in detecting touch events. For example, in a left-to-right linear input gesture, sensor elements 322A, 322B, 322C, and 322D can be utilized to detect the gesture. Although FIG. 3 shows sensing areas 322 as having two sensor elements, it is understood that sensing areas 322 can have any number of sensor elements (e.g., 3, 4, 5, etc. elements).

Figure 4:
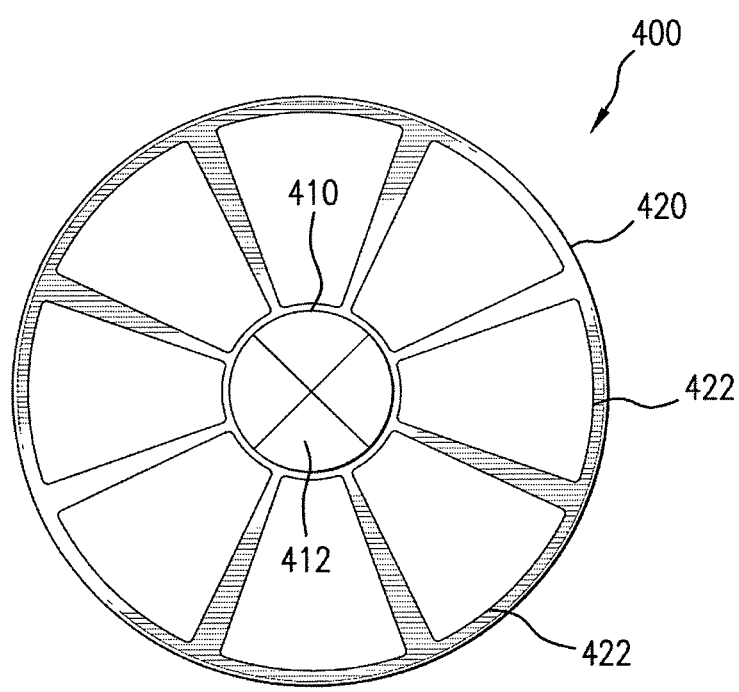
FIG. 4 illustrates an example of a capacitive sensor element arrangement.
Figure 5:
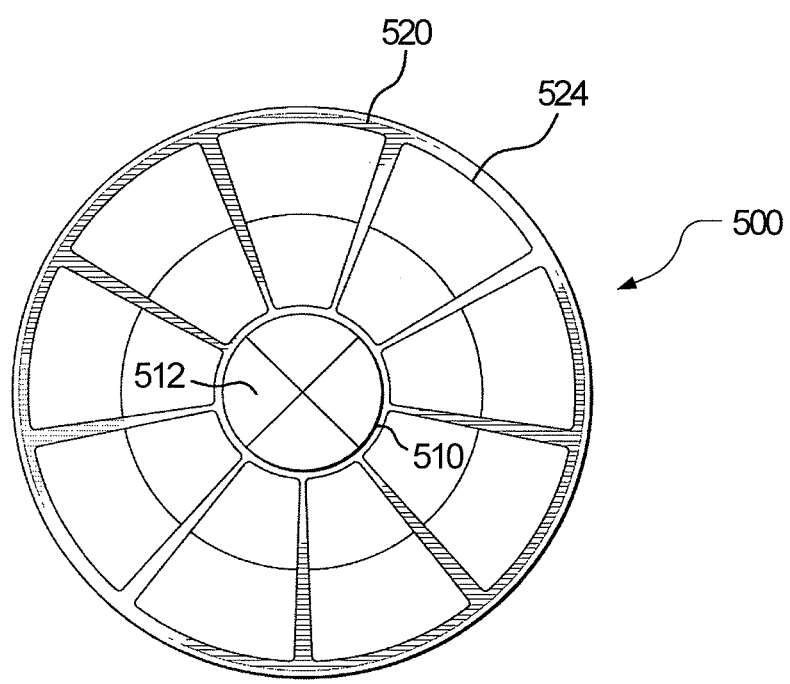
FIG. 5 illustrates an example of a capacitive sensor element arrangement.

FIGS. 4 and 5 illustrate capacitive sensor element arrangements that have multi-element capacitive sensing areas in their inner regions in accordance with some embodiments. In the embodiment illustrated in FIG. 4, inner region 410 of input device 110 can include multi-element capacitive sensing area 412. Although sensing area 412 is shown to include 4 sensor elements each capable of sensing an object, any number of elements may be used. Similarly, outer region 420 can include any number of capacitive sensor elements 422. In the embodiment illustrated in FIG. 5, inner region 510 of input device 110 can include multi-element capacitive sensing area 512, and outer region 520 can include a number of multi-element capacitive sensing areas 524.

Figure 6:
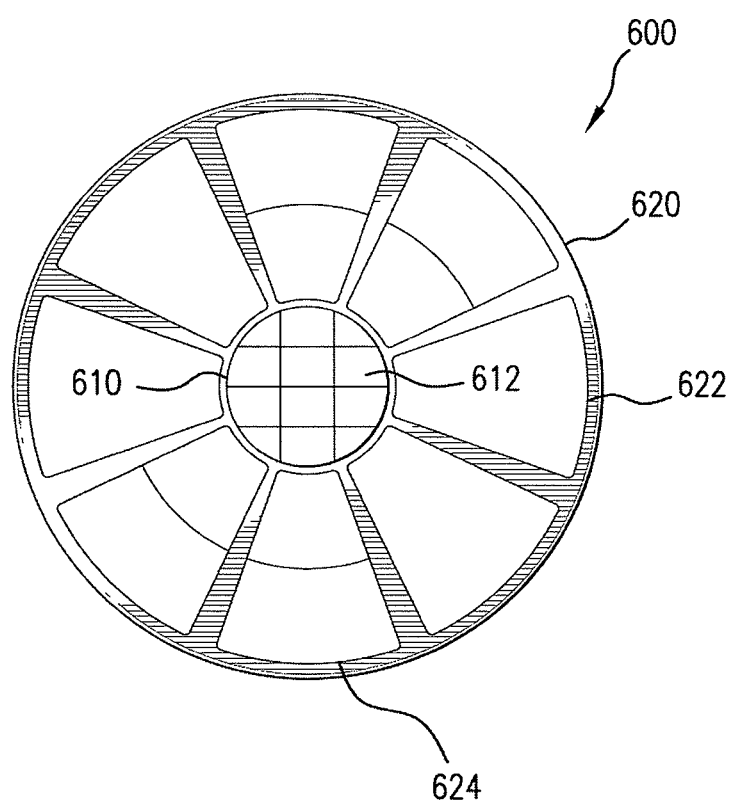
FIG. 6 illustrates an example of a capacitive sensor element arrangement.

FIG. 6 illustrates capacitive sensor element arrangement 600 having capacitive sensor elements and a trackpad in accordance with one embodiment. In the embodiment illustrated in FIG. 6, inner region 610 can include trackpad 612. Trackpad 612 can be a resistance sense track pad or a capacitance sensing trackpad, for example, formed of rows and columns of sensor elements. Outer region 620 can include a combination of capacitive sensor elements 622 and multi-element capacitive sensing areas 624 arranged in a closed loop path, or only single sensor elements or only multi-element sensing areas may be used. Combining a trackpad in an input device with discrete capacitive sensor elements can increase cost and power consumption compared to an input device having only discrete capacitive sensor elements, since different or more complex processing circuitry may be required to compensate for the coordinate-based sensing of the trackpad element. In other embodiments, inner region 612 can include any other type of sensing device, such as a fingerprint sensor or light-based (e.g., laser or LED) sensing device for example.

Figure 7:
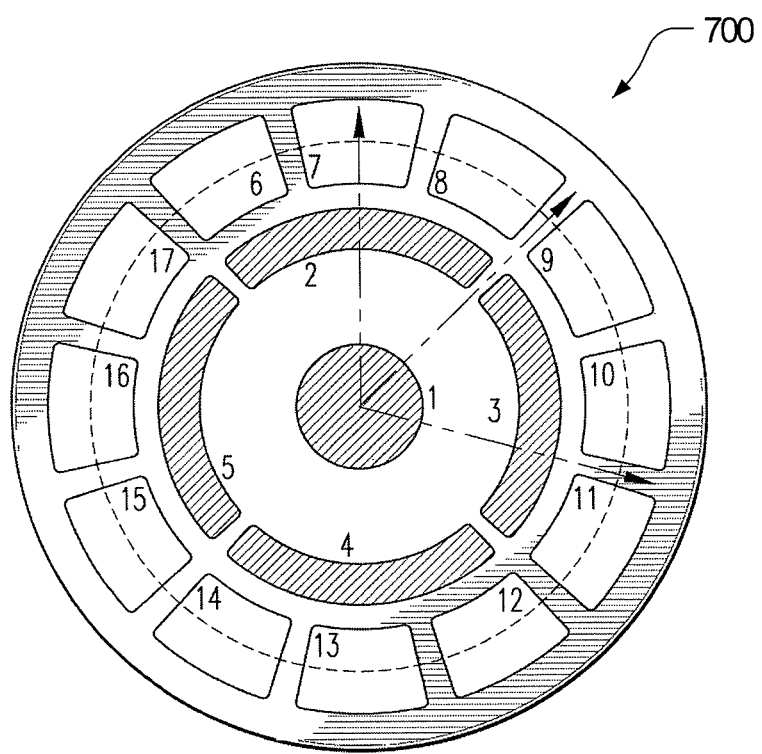
FIG. 7 illustrates an example of a capacitive sensor element arrangement.

FIG. 7 illustrates capacitive sensor element arrangement 700 in accordance with one embodiment. In the embodiment illustrated in FIG. 7, input device 110 can include 17 capacitive sensor elements arranged in an inner region near the center of input device 110 (represented by sensor element 1) and an outer region making up the periphery of input device 110 (represented by sensor elements 2-17). Since each sensor element is capable of independently or cooperatively sensing an object, the sensor elements can be configured to sense either single touch or multi-touch input events.

In the embodiment illustrated in FIG. 7, sensor element 1 can occupy the center of the substantially circular sensing area. A first or inner concentric ring of four sensor elements 2-5 can be positioned about central sensor element 1. Each of the sensor elements in the first concentric ring can define a shape of substantially equal area. A second or outer concentric ring including twelve sensor elements 6-17 can be positioned about the first concentric ring. Each of the sensor elements in the second concentric ring can similarly define a shape of substantially equal area. By designing sensor elements, such as sensor elements 2-17 for example, to define approximately the same surface area, the corresponding capacitive detection circuitry can be simplified since sensor elements with similar areas can produce similar capacitances in response to a touch of a user's finger.

Although the illustrated sensor element arrangements have a particular number of sensor elements arranged in a particular way, any suitable number and arrangement of sensor elements can be used. A suitable number and arrangement can be determined by weighing a combination of factors, such as sensor resolution, cost and power, for example. Higher sensor resolution can be achieved with a greater number of smaller sensor elements arranged closely together in a tight pitch. However, a greater number of sensor elements can increase cost, and require additional power to compensate for the time it takes to scan the additional elements to detect an input.

Higher sensor resolution can be advantageous in a variety of situations. For example, higher sensor resolution can enable better detection of motion and multi-touch input gestures because more sensor elements are likely to be touched during such gestures. This can be advantageous for applications in which user interface functionality relies heavily on the rate at which motion input is sensed, such as navigation control applications for example. This can also improve multi-touch input detection because more sensor elements can better capture the difference between a touch by one large finger in contrast to two small fingers positioned closely together, for example.

Device size, input device size and packaging can also influence the determination of a suitable number of elements to use. Packaging issues, for example, can include how certain materials may influence capacitive sensor detection, such as a glass cover placed over the sensor element arrangement for example. A thicker glass may require larger sensor elements to be utilized to ensure adequate capacitance detection through the thick glass.

As shown in the illustrated embodiments, the sensor elements can be circumferentially arranged, such as in a substantially circular closed loop pattern for example. In alternative embodiments the sensor elements can be arranged in a variety of other geometric patterns including, without limitation, ovals, ellipsoids, oblongs, etc. As shown in the illustrated embodiments, the sensor elements can be arranged on a substantially flat surface. However, alternative embodiments can include sensor elements arranged on non-flat surfaces, including without limitation, convex and concave surfaces.

The annular arrangement of the sensor elements can enable an angular position of an input, provided by a user's finger for example, to be determined relative to the input device. For example, utilizing the sensor element arrangement illustrated in FIG. 7, an angular position of a touch by a user's finger relative to input device 110 can be determined by first scanning sensor elements 2-17 in the following combinations to capture the following twelve readings (o)-(xi):

(o) scan sensor elements 2 and 6;
(i) scan sensor elements 2 and 7;
(ii) scan sensor elements 2 and 8;
(iii) scan sensor elements 3 and 9;
(iv) scan sensor elements 3 and 10;
(v) scan sensor elements 3 and 11;
(vi) scan sensor elements 4 and 12;
(vii) scan sensor elements 4 and 13;
(viii) scan sensor elements 4 and 14;
(ix) scan sensor elements 5 and 15;
(x) scan sensor elements 5 and 16;
(xi) scan sensor elements 5 and 17.

In this example, each of the twelve readings (o)-(xi) are associated with an angular position of a sensor element in the outer ring, which comprises sensor elements 6-17. The angular position determination can be made by scanning only the twelve outer ring elements, but including sensor elements 2-5 in the scanning process can increase the accuracy and resolution of the angular position determination.

Additionally, the sensor elements can be scanned at a speed substantially faster than that at which the user's finger moves relative to the sensor elements. For example, in this example all of the sensor element combinations comprising readings (o)-(xi) can be scanned within a few milliseconds. In effect, the relatively fast scanning speed provides a snapshot of the angular position of the user's finger relative to the sensing area. Since higher scanning speeds consume more power, it can be advantageous to scan only as fast and as often as necessary.

Using the twelve readings (o)-(xi) described above, the angular position of the user's finger can be calculated in a number of ways. In one embodiment, a centroid detection algorithm can be utilized according to the following formula:

$$C = \frac{\sum_{i=0}^{11} i R_i}{\sum_{i=0}^{11} R_i}$$

where i represents an index number uniquely associated with the angular position of each one of the sensor elements in the outer ring (i.e., the angular position of each of sensor elements 6-17 can be uniquely associated with a corresponding index number 0-11);

$R_i$ represents the amplitude of the signal measured in the reading (o)-(xi) associated with each of sensor elements 6-17 in the outer ring; and C represents a numerical value which varies as a function of detected signal amplitude and which can be used to identify the angular position of a user's finger relative to the sensor elements.

Figure 8:
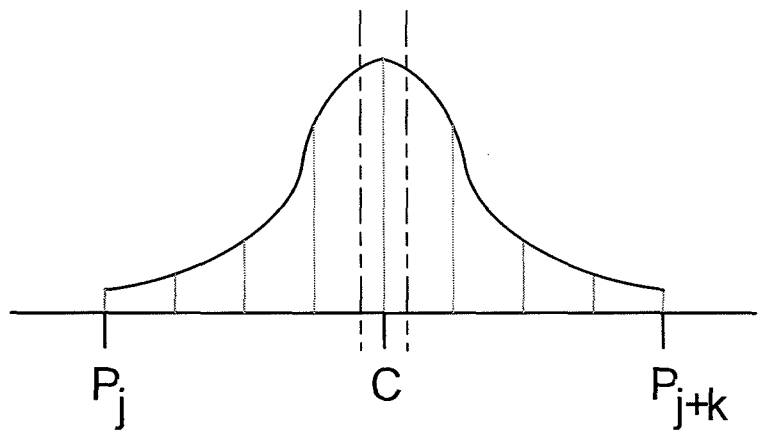
FIG. 8 illustrates an example of a histogram indicating one finger being applied to a touch sensitive surface.

As shown in the histogram of measured reading values of FIG. 8, the result of the calculation, C, is the centroid, or average, of the angular positions P weighted by the captured readings through which the plotted line is interpolated. Each position P relates to an angular position of one of sensor elements 6-17 in the outer ring. A peak in this histogram corresponds to sensor element signals of relatively greater amplitude, indicating the angular position of the user's finger. The result of the centroid calculation corresponds to this peak.

For example, if the calculated centroid C indicates a histogram peak near the (o) reading (in which sensor elements 2 and 6 are scanned) then this can indicate that the user's finger is located near the 11 o'clock position (associated with sensor element 6) shown in FIG. 7. Applying this example in the context of FIG. 8, Pj can represent the 9 o'clock position (associated with sensor element 16) and Pj+k can represent the 1 o'clock position (associated with sensor element 8). These positions show low readings, as evidence by the lowness of the graphed line, because sensor elements 16 and 8 are two sensor elements removed from the touched sensor element (sensor element 6) and therefore do not sense much capacitance. C can represent the 11 o'clock position (associated with sensor element 6).

The processing circuitry can apply the centroid calculation over all angular positions or over only those in which the captured readings exceeds a certain threshold amount. For example, in the above example, the centroid calculation can be applied over only those angular positions associated with sensor elements 16-17-6-7-8. The readings from the remaining sensor element positions can be presumed to be below a baseline that indicates no finger touch.

Figure 9:
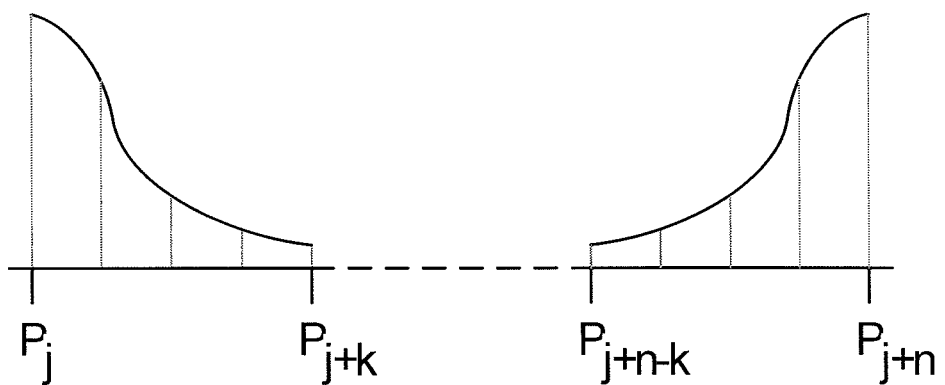
FIG. 9 illustrates an example of a histogram indicating one finger being applied to a touch sensitive surface.

The processing circuitry can also define the range for each centroid calculation to be between angular positions located at or below the baseline. If the range is not defined in this manner, the circuitry can incorrectly conclude the presence of two fingers rather than one. For example, the histogram of FIG. 9 shows a peak reading at sensor element angular position of Pj (e.g., corresponding to the i=0 position in the current example) and at sensor element angular position Pj+n (e.g., corresponding to the i=11 position in the current example). Although the sensor elements associated with positions Pj and Pj+n can be angularly adjacent to one another on an input device, the histogram shows two peaks rather than one. If the centroid calculation defines the range for the centroid calculation from i=Pj to Pj+n, it can identify two centroids—one between Pj and Pj+k, and another between Pj+n−k and Pj+n—incorrectly indicating a finger at two locations on the input device. In contrast, by defining the calculation range from one low point, such as Pj+n−k, to the next low point, such as Pj+k, the circuitry can correctly identify only one centroid indicating the presence of one finger on the input device.

In another embodiment, the angular position of the user's finger can be calculated using a line crossing method based on the twelve readings (o)-(xi) described above. In the line crossing method, the slope of the histogram of measured reading values can be used to determine the location of the histogram peak. For example, readings that increase from one detected angular position to the next provide a positively-sloped histogram. Conversely, readings that decrease from one detected angular position to the next provide a negatively-sloped histogram. The histogram peak, indicating the angular position of the user's finger, can be identified as the mid-point between the positively-sloped histogram values and the negatively-sloped histogram values.

Figure 10:
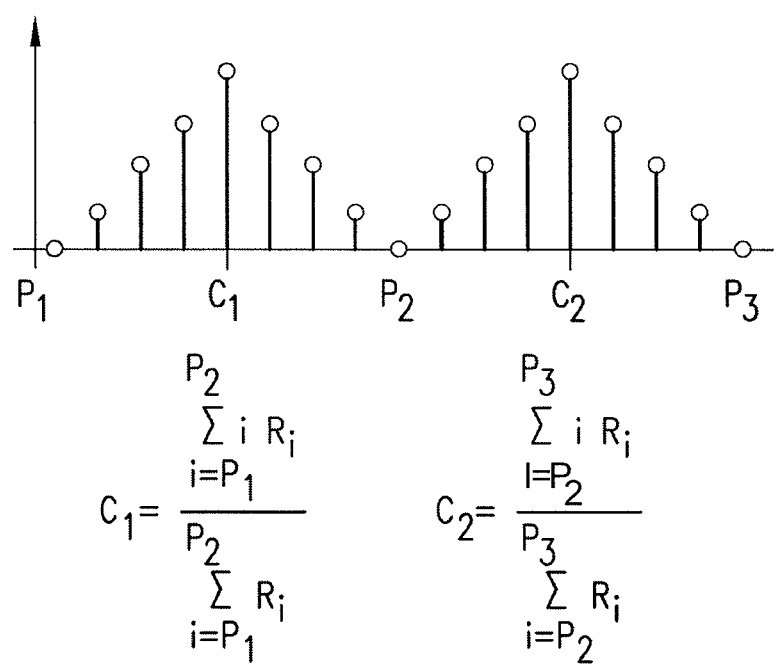
FIG. 10 illustrates an example of a histogram indicating two fingers being applied to a touch sensitive surface.
Figure 11:
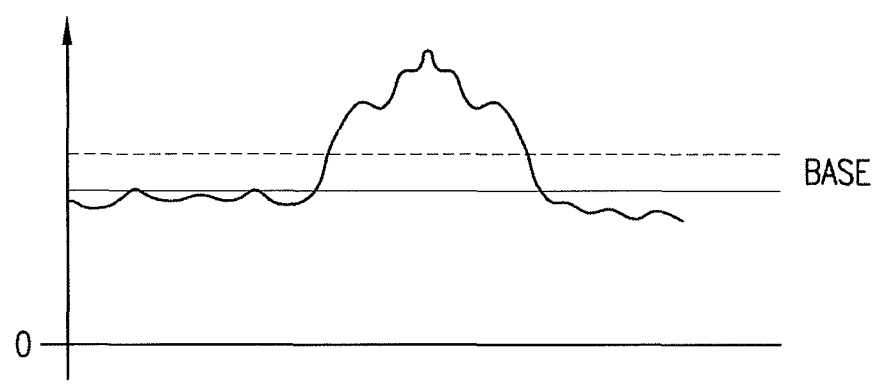
FIG. 11 illustrates an example of a histogram indicating two fingers being applied to a touch sensitive surface.

The methods described above can also enable detection of more than one finger applied to the sensing surface. For example, when two fingers are placed on the sensing surface, a histogram of the measured sensor element readings can have two peaks, with each peak being associated with the respective angular location of an applied finger. FIG. 10 illustrates an example of a histogram indicating two fingers being applied to the sensing surface. In the case of two fingers, the detected amplitude (also occasionally referred to as the detected "mass") can be about twice the detected amplitude for one finger. When two fingers are spaced relatively far apart, the resulting histogram can display two relatively separate and distinct bell-shaped curves (as shown, for example, in FIG. 10). When two fingers are spaced relatively close together, the separation between the bell-shaped curves can be less distinct (as shown, for example, in FIG. 11).

Accordingly, to enable multi-touch detection in one embodiment the processing circuitry can first determine whether the aggregate of the sensor element readings exceed a certain threshold. The thresholds can be set at levels indicating whether one, two, three or more fingers are deemed to be touching the touch sensitive surface of the input device. If the aggregate readings indicate one finger on the touch sensitive surface, the angular position of the touch can be determined by the centroid calculation or the line crossing method described above for example. If the aggregate readings indicate more than one finger on the touch sensitive surface, the angular position of the touch can be determined in a number of ways.

Figure 12:
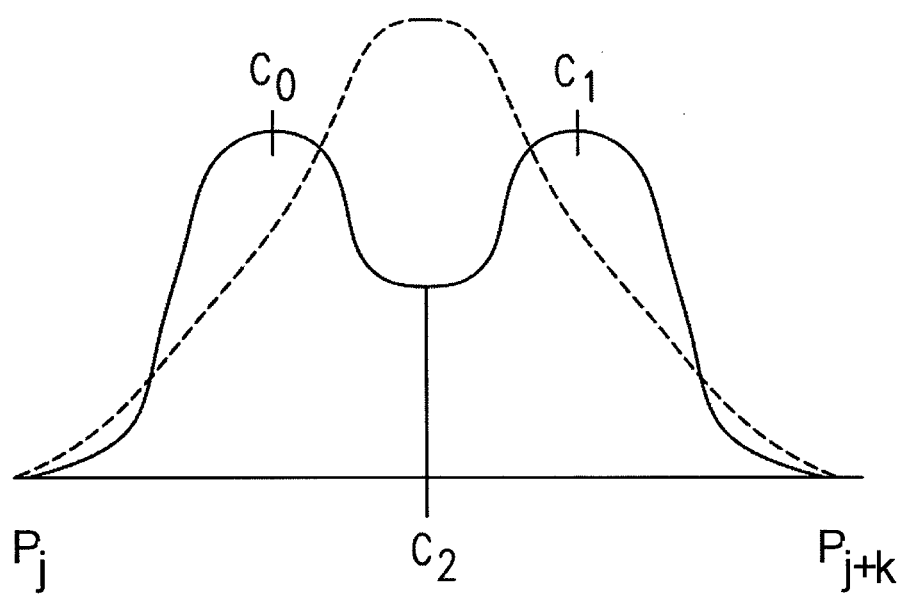
FIG. 12 illustrates an example of a histogram indicating two fingers being applied to a touch sensitive surface.
Figure 13:
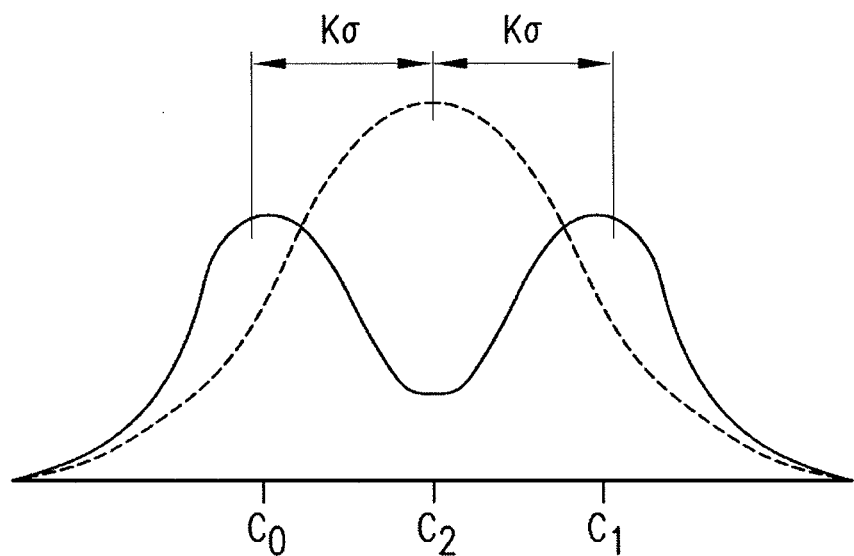
FIG. 13 illustrates an example of a histogram indicating two fingers being applied to a touch sensitive surface.

For example, if the fingers are spaced relatively far apart, their angular position can be determined using the line crossing method described above since the peaks of a resulting histogram are likely to be well-defined. However, in a situation in which two fingers are spaced relatively close together, the line crossing method may not be effective due to the lack of separation between peaks as shown, for example, in FIG. 11. In this situation, the angular position of each finger can be determined to be an offset, by a standard deviation factor, from the midpoint position of the readings determined by the centroid calculation described above. For instance, the centroids of each of two fingers (represented as C0 and C1) can be calculated as shown in FIGS. 12 and 13 and as follows:

$$\sigma = \sqrt{\frac{1}{N}\sum_{i=1}^{N}(x_i - \overline{x})^2}.$$

$$C_0 = C_2 - K\sigma$$

$$C_1 = C_2 + K\sigma$$

Where

σ (sigma) represents the standard deviation of the entire "two finger" histogram;

N represents the number of angular positions x represents the amplitude of the signal measured (same as R above)

$\overline{x}$ represents the mean average of R

K represents a constant between 0.5 and 3.0; and $C_2$ represents the centroid of the entire histogram.

The ability to detect the angular position of more than one finger applied to the sensing surface can provide several advantages. For example, if the sensing area is used in combination with a display, the ability to detect the location of two different fingers can enable the user to use at least two pieces of information to manipulate displayed data. This feature can enable detection, for example, of an increase in relative distance between two fingers on the sensing surface (a gesture sometimes referred to as "zooming"). Similarly, this feature can enable detection of a decrease in relative distance between two fingers on the sensing surface (a gesture sometimes referred to as "pinching"). In this manner, two pieces of information can be used to manipulate data on the user interface. The need for additional buttons or other input devices to manipulate data can thereby be reduced or eliminated.

In a somewhat similar manner, a radial position of the user's finger can also be determined. Again referring to input device 110 configured with the sensor element arrangement illustrated in FIG. 7, the relative radial position of a user's finger can be detected by scanning sensor elements 1-17 in the following combinations to capture the following three readings (xii)-(xiv):

(xii) scan sensor element 1;
(xiii) scan sensor elements 2-5;
(xiv) scan sensor elements 6-17.

In this example the first reading (xii) is associated with central sensor element 1, the second reading (xiii) is associated with inner ring of sensor elements 2-5 and the third reading (xiv) is associated with outer ring of sensor elements 6-17. The scanning speed can also be preferably substantially faster than the speed at which a user's finger moves relative to the sensor elements. For example, in this embodiment all of the sensor element combinations comprising three readings (xii)-(xiv) may be scanned within a few milliseconds. In effect, the relatively fast scanning speed can provide a snapshot of the radial position of the user's finger relative to the sensing area.

Using the three readings (xii)-(xiv), the radial position of the user's finger can be calculated using a centroid detection algorithm according to the following formula:

$$C = \frac{\sum_i i R_i}{\sum_i R_i}$$

Where i represents an index number uniquely associated with a radial position of the center sensor element, the inner ring or the outer ring;

$R_i$ represents the amplitude of the signal measured in the reading (xii)-(xiv) associated with the center sensor element, the inner ring or the outer ring;

C represents a numerical value which varies as a function of detected signal amplitude and which may be used to identify the radial position of a user's finger relative to the sensor elements.

As before, the results of the radial calculation can be represented in the form of a histogram. A peak in this histogram corresponds to the detection of sensor element signals of relatively greater amplitude, indicating the radial position of the user's finger. The result of the centroid calculation corresponds to this peak. For example, if the calculation indicates a histogram peak near the (xiv) reading (in which the outer ring sensor elements are collectively scanned) then this can indicate that the user's finger is located near the outer ring.

In some situations, the processing circuitry may only need to determine whether more than one finger is applied to the sensing area, rather than determine a specific location of the fingers. In this situation, if the magnitude of the measured signals is above a certain threshold amount that indicates the presence of more than one finger, the input device circuitry need not perform the above positional calculations. In other situations, the input device circuitry can adjust its sensing sensitivity in order to compensate for fingers of different sizes, such as those of adults and children.

FIGS. 14-17 illustrate examples of user applications that can be performed on a portable electronic device using an input device configured in accordance with the various embodiments described herein.

Figure 14:
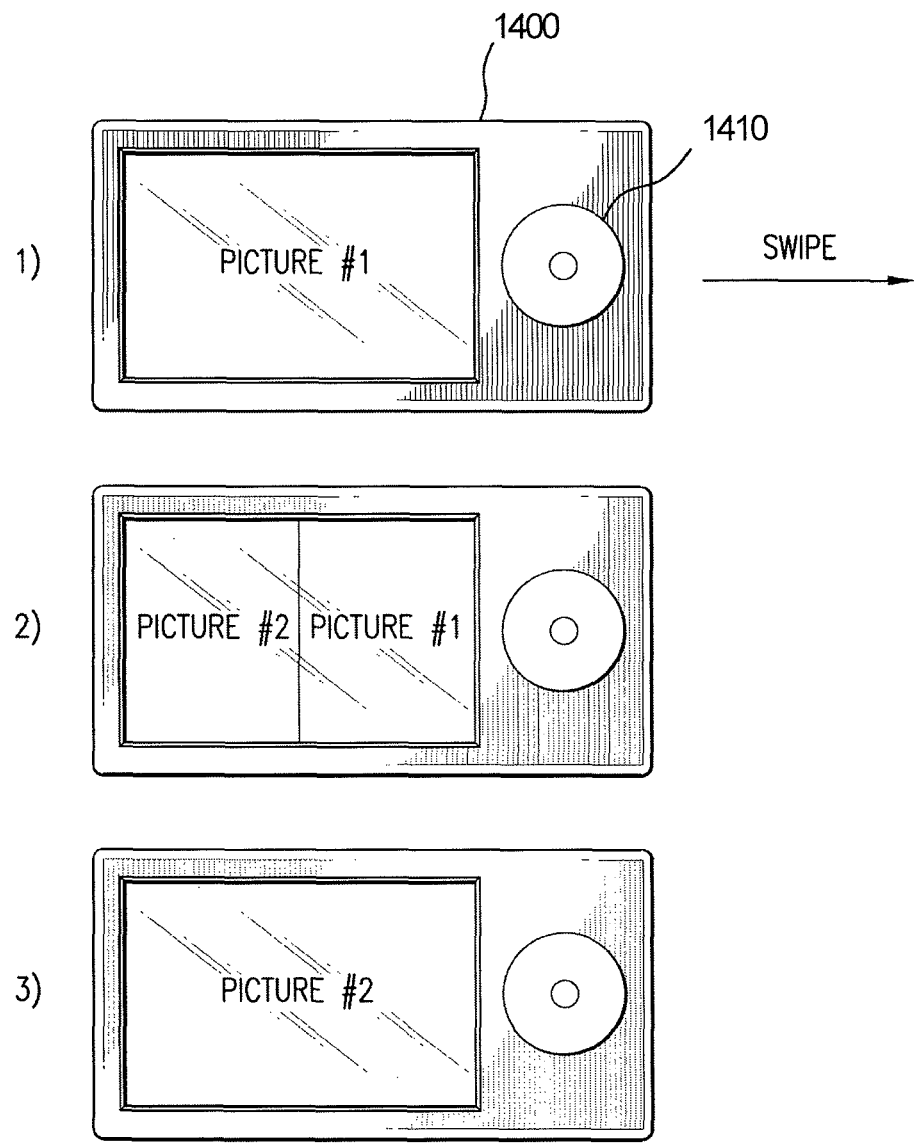
FIG. 14 illustrates an example of a user application that may be performed on an electronic device in response to a linear input.

In the embodiment illustrated in FIG. 14, input device 1410 can detect a linear input gesture to enable portable media device 1400 to execute an image browsing application. An example of an image browsing application that causes images, such as album cover pictures (in a "coverflow" application) for example, to be transitioned across a screen may be found in U.S. patent application Ser. No. 11/767,409 entitled "Media Player with Imaged Based Browsing," filed Jun. 22, 2007, which is incorporated herein by reference in its entirety. In the embodiment illustrated in FIG. 14, media device 1400 can display picture #1 in a landscape orientation. Device 1400 can determine its orientation based on one or more orientation detection elements, such as an accelerometer for example. When input device 1410 detects a swipe in a left-to-right direction, media device 1400 can transition the display of picture #1 to picture #2 by sliding picture #2 in from the left of the display screen as illustrated.

Figure 15:
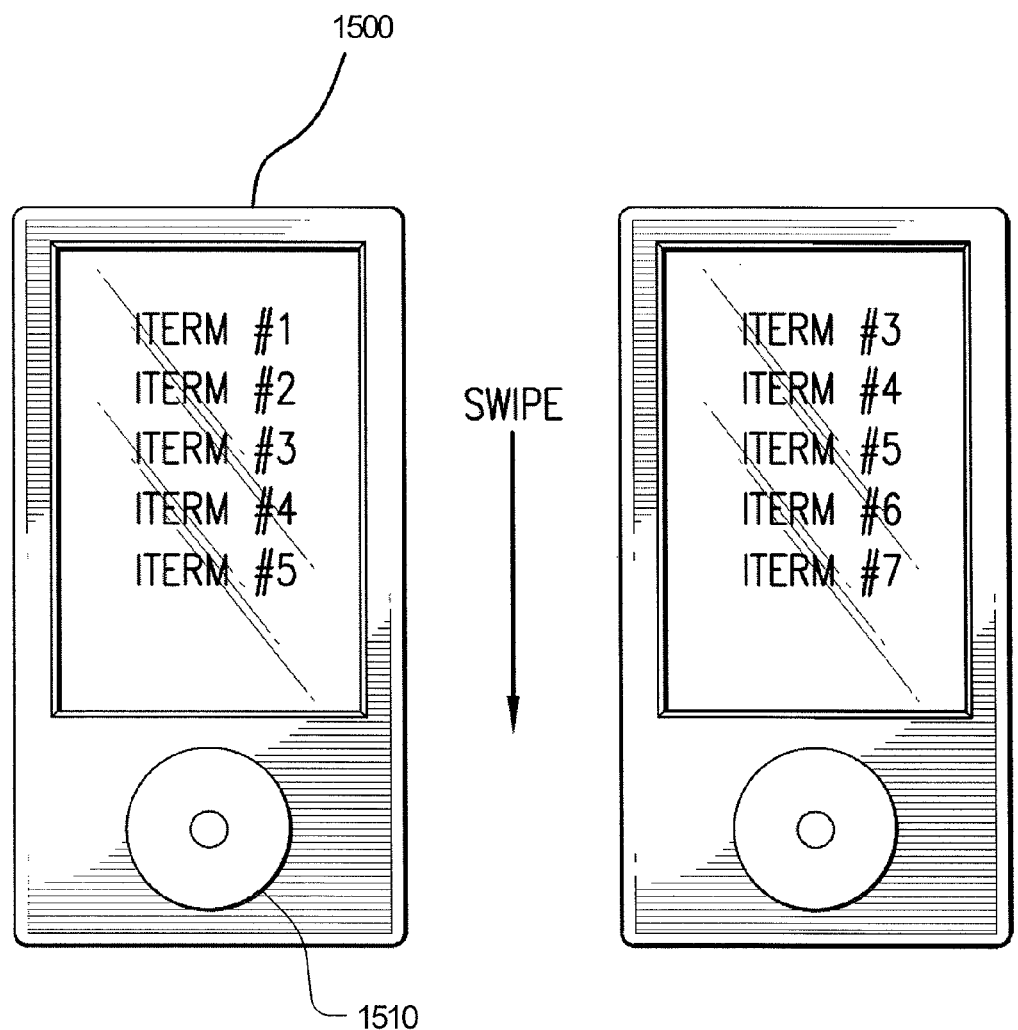
FIG. 15 illustrates an example of a user application that may be performed on an electronic device in response to a linear input.

In the embodiment illustrated in FIG. 15, input device 1510 can detect a linear input gesture to enable portable media device 1500 to provide list navigation. In a portrait orientation, media device 1500 can display a list of items on its display screen. When input device 1510 detects a vertical swipe in an up-to-down direction, media device 1500 can scroll the list in a downward direction in response to the applied input.

Figure 16:
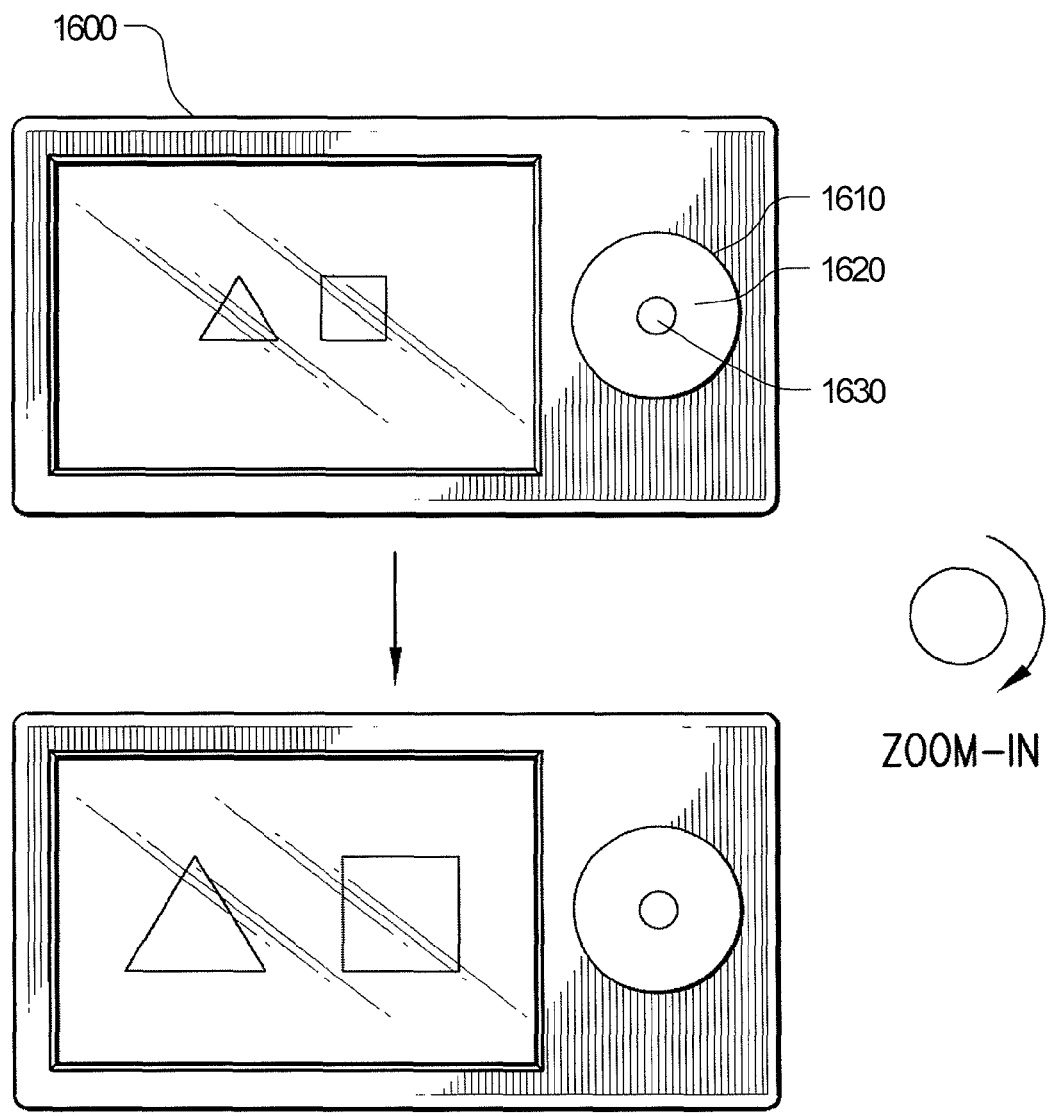
FIG. 16 illustrates an example of a user application that may be performed on an electronic device in response to a multi-touch input.
Figure 17:
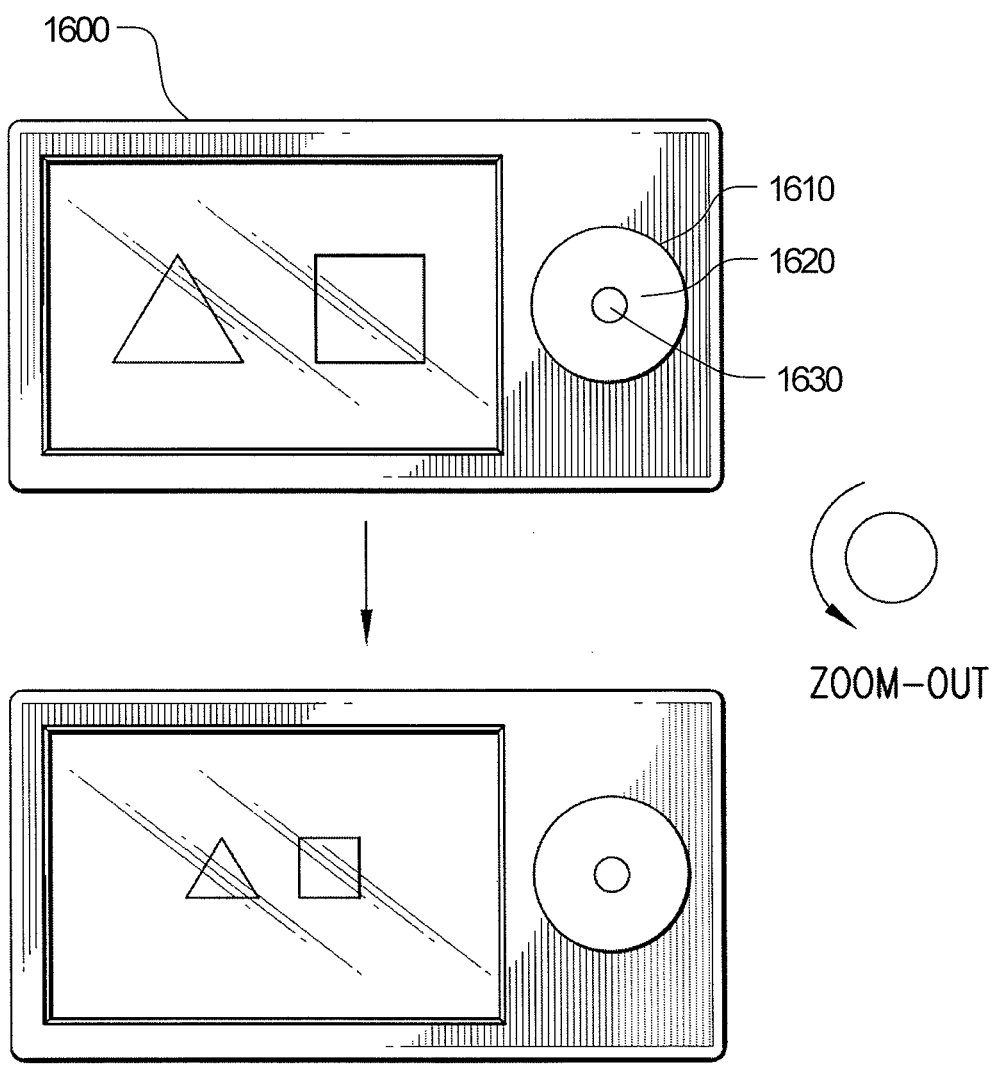
FIG. 17 illustrates an example of a user application that may be performed on an electronic device in response to a multi-touch input.

In the embodiment illustrated in FIG. 16, input device 1610 can detect a multi-touch input gesture to enable portable media device 1600 to execute a zoom-in feature in connection with a displayed image. In the illustrated embodiment, media device 1500 can display an image on its display screen. When input device 1610 detects one finger in inner region 1630 and another finger rotating in the clockwise direction in outer region 1620, media device 1600 can zoom in on the displayed image in response to the applied input. Similarly, in the embodiment illustrated in FIG. 17, when input device 1610 detects one finger in inner region 1630 and another finger rotating in the counterclockwise direction in outer region 1620, media device 1600 can zoom out from the displayed image in response to the applied input.

An input device can also enable zooming by detecting a pinch gesture. In one embodiment, an input device can enable a distance between at least two fingers applied to its touch sensitive surface to be determined. In another embodiment, an input device can enable a distance between one or more fingers applied to its touch sensitive surface and some other reference point, such as the center of the input device for example, to be determined. If the determined distance increases during the input event, indicating a spreading apart motion, a zoom-in signal can be generated. If the compared distance decreases during the input event, indicating a closing together motion, a zoom-out signal can be generated.

The amount of zooming can vary according to the determined distance. Furthermore, the zooming can occur in relation to the motion of the fingers. For instance, as the fingers spread apart or close together, the object can be zoomed in or zoomed out at the same time. Although this methodology can be directed at zooming, it can also be used for other applications, such as enlarging or reducing for example. Zooming can be particularly useful in graphical programs such as publishing, photo, and drawing programs for example.

In another embodiment, input device processing circuitry can be configured to recognize principal directions of applied gestures and modify the scanning pattern accordingly. For example, the circuitry can optimize the scanning pattern so that input events applied at positions of 0, 90, 180, 270 degrees, for example, obtain better signal to noise ratios than input events applied at other positions.

In another embodiment, input device processing circuitry can switch between different sensing configurations in order to achieve power savings. In a particular sensing configuration, the circuitry can enable only sensor elements arranged according to a predefined input pattern to sense input. For example, in a "swipe mode", only linearly arranged sensor elements can be enabled to sense input. Similarly, in a "legacy wheel mode", only radially arranged sensor elements can be enabled to sense input. In a "gesture mode", all sensor elements can be enabled so that any pattern of gestural input can be sensed by the input device. The particular sensing configuration to be utilized by the input device can be based on a context of an application running on the portable media device, for example.

Figure 18A:
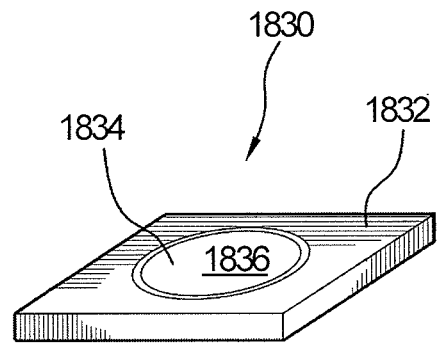
FIGS. 18A-18C illustrate an example of operations of an input device.
Figure 18B:
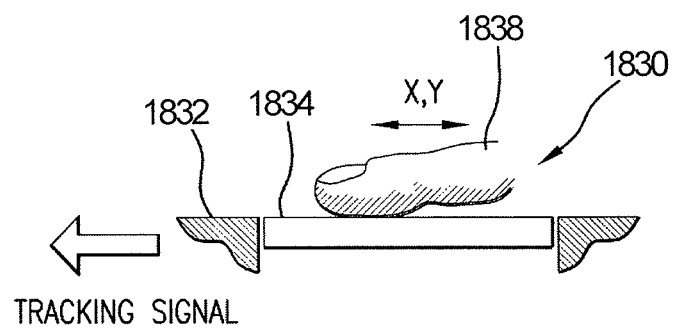
Figure 18C:
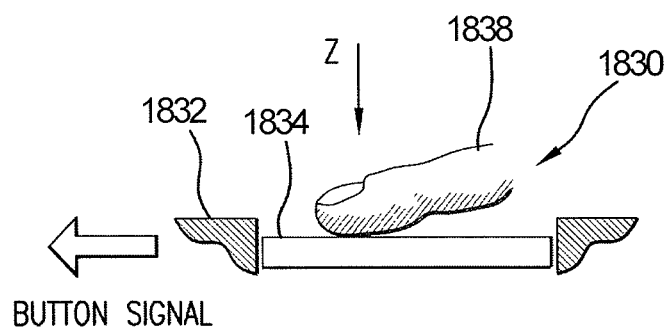

FIGS. 18A-18C illustrate operations of an input device according to some embodiments of the present disclosure. By way of example, the input device may generally correspond to input device 110. In the example shown in FIG. 18A, input device 1830 can be configured to send information or data to an electronic device in order to perform an action on a display screen (e.g., via a graphical user interface). Examples of actions that may be performed include, moving an input pointer, making a selection, providing instructions, etc. The input device can interact with the electronic device through a wired connection (e.g., cable/connector) or a wireless connection (e.g., IR, Bluetooth, etc.). Input device 1830 may be a stand alone unit or it may be integrated into the electronic device. As a stand alone unit, the input device can have its own enclosure. When integrated into an electronic device, the input device can typically use the enclosure of the electronic device. In either case, the input device can be structurally coupled to the enclosure, as for example, through screws, snaps, retainers, adhesives and the like. In some cases, the input device may be removably coupled to the electronic device, as for example, through a docking station. The electronic device to which the input device may be coupled can correspond to any consumer related electronic product. By way of example, the electronic device can correspond to a computer such as a desktop computer, laptop computer or PDA, a media player such as a music player, a communication device such as a cellular phone, another input device such as a keyboard, and the like.

As shown in FIG. 18A, in this embodiment input device 1830 may include frame 1832 (or support structure) and touch pad 1834. Frame 1832 can provide a structure for supporting the components of the input device. Frame 1832 in the form of a housing can also enclose or contain the components of the input device. The components, which may include touch pad 1834, can correspond to electrical, optical and/or mechanical components for operating input device 1830. Frame 1832 may be a separate component or it may be an integral component of the housing of the electronic device.

Touch pad 1834 can provide location information for an object, such as a finger for example, in contact with or in proximity to the touch pad. This information can be used in combination with information provided by a movement indicator to generate a single command associated with the movement of the touch pad. The touch pad may be used as an input device by itself; for example, the touch pad may be used to scroll through a list of items on the device.

The shape, size and configuration of touch pad 1834 may be widely varied. In addition to the touchpad configurations disclosed above, a conventional touch pad based on the Cartesian coordinate system, or based on a Polar coordinate system can be configured to provide scrolling using rotational movements and can be configured to accept the multi-touch and gestures, for example those described herein. An example of a touch pad based on polar coordinates may be found in U.S. Pat. No. 7,046,230 which is incorporated by reference above. Furthermore, touch pad 1834 can be used in at least two different modes, which may be referred to as a relative mode and an absolute mode. In absolute mode, touch pad 1834 can, for example, report the absolute coordinates of the location at which it may be touched. For example, these would be "x" and "y" coordinates in the case of a standard Cartesian coordinate system or (r,θ) in the case of a Polar coordinate system. In relative mode, touch pad 1834 can report the direction and/or distance of change, for example, left/right, up/down, and the like. In most cases, the signals produced by touch pad 1834 can direct movement on the display screen in a direction similar to the direction of the finger as it may be moved across the surface of touch pad 1834.

Further examples of touch pad configurations may be found in U.S. patent application Ser. No. 10/949,060 entitled "Raw Data Track Pad Device and System," filed Sep. 24, 2004, U.S. patent application Ser. No. 11/203,692 entitled "Method of Increasing the Spatial Resolution of Touch Sensitive Devices," filed Aug. 15, 2005, and U.S. patent application Ser. No. 11/818,395 entitled "Touch Screen Stack-Ups," filed Jun. 13, 2007, all of which are incorporated herein by reference in their entireties.

Further examples of touch pad sensing may be found in U.S. patent application Ser. No. 10/903,964 entitled "Gestures for Touch Sensitive Input Devices," filed Jul. 30, 2004, U.S. patent application Ser. No. 11/038,590 entitled "Mode-Based Graphical User Interfaces for Touch Sensitive Input Devices," filed Jan. 18, 2005, U.S. patent application Ser. No. 11/048,264 entitled "Gestures for Touch Sensitive Input Devices," filed Jan. 31, 2005, U.S. patent application Ser. No. 11/232,299 entitled "System and Method for Processing Raw Data of Track Pad Device," filed Sep. 21, 2005, and U.S. patent application Ser. No. 11/619,464 entitled "Multi-Touch Input Discrimination," filed Jan. 3, 2007, all of which are incorporated herein by reference in their entireties.

The shape of touch pad 1834 may be widely varied. For example, it may be circular, oval, square, rectangular, triangular, and the like. In general, the outer perimeter can define the working boundary of touch pad 1834. In the embodiment illustrated in FIG. 18, the touch pad may be circular. Circular touch pads can allow a user to continuously swirl a finger in a free manner, i.e., the finger may be rotated through 360 degrees of rotation without stopping. This form of motion can produce incremental or accelerated scrolling through a list of songs being displayed on a display screen, for example. Furthermore, the user may rotate his or her finger tangentially from all sides, thus providing more finger position range. Both of these features may help when performing a scrolling function. Furthermore, the size of touch pad 1834 can accommodate manipulation by a user (e.g., the size of a finger tip or larger).

Touch pad 1834, which can generally take the form of a rigid platform. The rigid platform may be planar, convex or concave, and may include touchable outer surface 1836, which may be textured, for receiving a finger or other object for manipulation of the touch pad. Although not shown in FIG. 18A, beneath touchable outer surface 1836 can be a sensor arrangement that may be sensitive to such things as the pressure and movement of a finger thereon. The sensor arrangement may typically include a plurality of sensors that can be configured to activate as the finger sits on, taps on or passes over them. In the simplest case, an electrical signal can be produced each time the finger is positioned over a sensor. The number of signals in a given time frame may indicate location, direction, speed and acceleration of the finger on touch pad 1834, i.e., the more signals, the more the user moved his or her finger. In most cases, the signals can be monitored by an electronic interface that converts the number, combination and frequency of the signals into location, direction, speed and acceleration information. This information can then be used by the electronic device to perform the desired control function on the display screen. The sensor arrangement may be widely varied. By way of example, the sensors can be based on resistive sensing, surface acoustic wave sensing, pressure sensing (e.g., strain gauge), optical sensing, capacitive sensing and the like.

In the embodiment illustrated in FIG. 18, touch pad 1834 may be based on capacitive sensing. In most cases, the capacitive touch pad may include a protective shield, one or more electrode layers, a circuit board and associated electronics including an application specific integrated circuit (ASIC). The protective shield can be placed over the electrodes, the electrodes can be mounted on the top surface of the circuit board, and the ASIC can be mounted on the bottom surface of the circuit board. The protective shield may serve to protect the underlayers and to provide a surface for allowing a finger to slide thereon. The surface may generally be smooth so that the finger does not stick to it when moved. The protective shield also may provide an insulating layer between the finger and the electrode layers. The electrode layer may include a plurality of spatially distinct electrodes. Any suitable number of electrodes can be used. As the number of electrodes increases, the resolution of the touch pad also increases.

In accordance with one embodiment, touch pad 1834 can be movable relative to the frame 1832. This movement can be detected by a movement detector that generates another control signal. By way of example, touch pad 1834 in the form of the rigid planar platform can rotate, pivot, slide, translate, flex and/or the like relative to frame 1832. Touch pad 1834 can be coupled to frame 1832 and/or it can be movably restrained by frame 1832. By way of example, touch pad 1834 can be coupled to frame 1832 through axels, pin joints, slider joints, ball and socket joints, flexure joints, magnets, cushions and/or the like. Touch pad 1834 can also float within a space of the frame (e.g., gimbal). It should be noted that input device 1830 may additionally include a combination of joints such as a pivot/translating joint, pivot/flexure joint, pivot/ball and socket joint, translating/flexure joint, and the like to increase the range of movement (e.g., increase the degree of freedom).

When moved, touch pad 1834 can be configured to actuate a movement detector circuit that generates one or more signals. The circuit may generally include one or more movement detectors such as switches, sensors, encoders, and the like.

In the embodiment illustrated in FIG. 18, touch pad 1834 can be part of a depressible platform. The touch pad can operate as a button and perform one or more mechanical clicking actions. Multiple functions or the same function of the device may be accessed by depressing the touch pad 1834 in different locations. A movement detector signals that touch pad 1834 has been depressed, and touch pad 1834 signals a location on the platform that has been touched. By combining both the movement detector signals and touch pad signals, touch pad 1834 acts like multiple buttons such that depressing the touch pad at different locations corresponds to different buttons. As shown in FIGS. 18B and 18C, according to one embodiment touch pad 1834 can be capable of moving between an upright position (FIG. 18B) and a depressed position (FIG. 18C) when a requisite amount of force from finger 1838, palm, hand or other object is applied to touch pad 1834. Touch pad 1834 can be spring biased in the upright position, as for example through a spring member. Touch pad 1834 moves to the depressed position when the spring bias is overcome by an object pressing on touch pad 1834.

As shown in FIG. 18B, touch pad 1834 generates tracking signals when an object such as a user's finger is moved over the top surface of the touch pad in the x, y plane. As shown in FIG. 18C, in the depressed position (z direction), touch pad 1834 generates positional information and a movement indicator generates a signal indicating that touch pad 1834 has moved. The positional information and the movement indication can be combined to form a button command. Different button commands or the same button command can correspond to depressing touch pad 1834 in different locations. The different commands may be used for various functionalities including, but not limited to, making selections or issuing commands associated with operating an electronic device. By way of example, in the case of a music player, the button commands may be associated with opening a menu, playing a song, fast forwarding a song, seeking through a menu and the like.

To elaborate, touch pad 1834 can be configured to actuate a movement detector, which together with the touch pad positional information, can form a button command when touch pad 1834 is moved to the depressed position. The movement detector can be located within frame 1832 and coupled to touch pad 1834 and/or frame 1832. The movement detector may be any combination of switches and sensors. Switches can be generally configured to provide pulsed or binary data such as activate (on) or deactivate (off). By way of example, an underside portion of touch pad 1834 can be configured to contact or engage (and thus activate) a switch when the user presses on touch pad 1834. The sensors, on the other hand, can be generally configured to provide continuous or analog data. By way of example, the sensor can be configured to measure the position or the amount of tilt of touch pad 1834 relative to the frame when a user presses on the touch pad 1834. Any suitable mechanical, electrical and/or optical switch or sensor may be used. For example, tact switches, force sensitive resistors, pressure sensors, proximity sensors, and the like may be used. In some case, the spring bias for placing touch pad 1834 in the upright position may be provided by a movement detector that includes a spring action. In other embodiments, input device 1830 can include one or more movement detectors in various locations positioned under and/or above touch pad 1834 to form button commands associated with the particular locations in which the movement detector is actuated.

Touch pad 1834 may can also be configured to provide a force feedback response. An example of touch pad configuration providing a haptic feedback response may be found in U.S. Pat. No. 6,337,678 entitled "Force Feedback Computer Input and Output Device with Coordinated Haptic Elements," which is incorporated herein by reference in its entirety.

Figure 19:
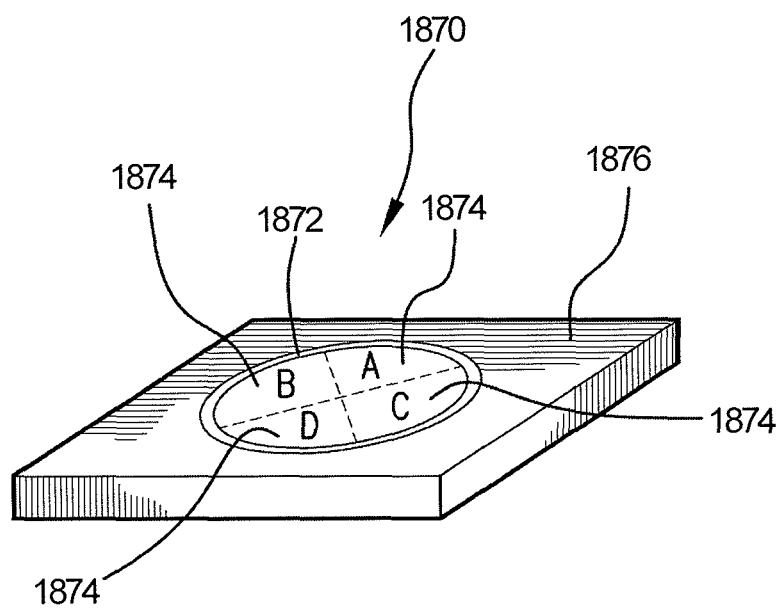
FIG. 19 illustrates an example of an input device.

FIG. 19 illustrates a simplified perspective diagram of input device 1870. Like the input device shown in the embodiment of FIGS. 18A-18C, this input device 1870 incorporates the functionality of one or more buttons directly into touch pad 1872, i.e., the touch pad acts like a button. In this embodiment, however, touch pad 1872 can be divided into a plurality of independent and spatially distinct button zones 1874. Button zones 1874 may represent regions of the touch pad 1872 that can be moved by a user to implement distinct button functions or the same button function. The dotted lines may represent areas of touch pad 1872 that make up an individual button zone. Any number of button zones may be used, for example, two or more, four, eight, etc. In the embodiment illustrated in FIG. 19, touch pad 1872 may include four button zones 1874 (i.e., zones A-D).

As should be appreciated, the button functions generated by pressing on each button zone may include selecting an item on the screen, opening a file or document, executing instructions, starting a program, viewing a menu, and/or the like. The button functions may also include functions that make it easier to navigate through the electronic system, as for example, zoom, scroll, open different menus, home the input pointer, perform keyboard related actions such as enter, delete, insert, page up/down, and the like. In the case of a music player, one of the button zones may be used to access a menu on the display screen, a second button zone may be used to seek forward through a list of songs or fast forward through a currently playing song, a third button zone may be used to seek backwards through a list of songs or fast rearward through a currently playing song, and a fourth button zone may be used to pause or stop a song that may be in the process of being played.

To elaborate, touch pad 1872 can be capable of moving relative to frame 1876 so as to create a clicking action. Frame 1876 can be formed from a single component or a combination of assembled components. The clicking action can actuate a movement detector contained inside frame 1876. The movement detector can be configured to sense movements of the button zones during the clicking action and to send a signal corresponding to the movement to the electronic device. By way of example, the movement detectors may be switches, sensors and/or the like.

In addition, touch pad 1872 can be configured to send positional information on what button zone may be acted on when the clicking action occurs. The positional information can allow the device to determine which button zone to activate when the touch pad is moved relative to the frame.

The movements of each of button zones 1874 may be provided by various rotations, pivots, translations, flexes and the like. In one embodiment, touch pad 1872 can be configured to gimbal relative to frame 1876. By gimbal, it is generally meant that the touch pad 1872 can float in space relative to frame 1876 while still being constrained thereto. The gimbal can allow the touch pad 1872 to move in single or multiple degrees of freedom (DOF) relative to the housing, for example, movements in the x, y and/or z directions and/or rotations about the x, y, and/or z axes (Oxeyez).

Figure 20:
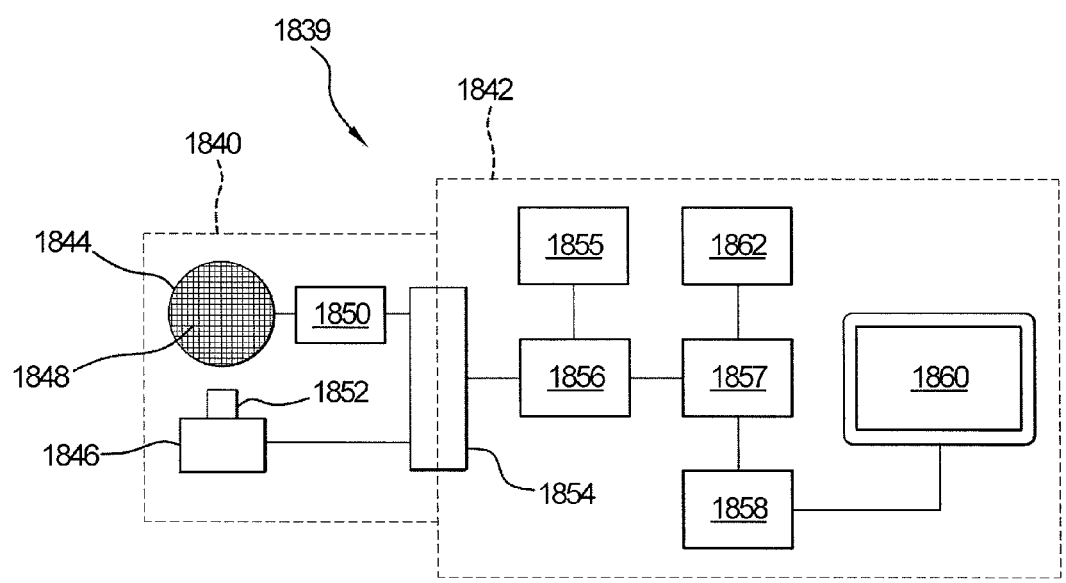
FIG. 20 illustrates an example of a computing system.

FIG. 20 illustrates an example of a simplified block diagram of a computing system 1839. The computing system may generally include input device 1840 operatively connected to computing device 1842. By way of example, input device 1840 can generally correspond to input device 1830 shown in FIGS. 18A-18C, and the computing device 1842 can correspond to a computer, PDA, media player or the like. As shown, input device 1840 may include depressible touch pad 1844 and one or more movement detectors 1846. Touch pad 1844 can be configured to generate tracking signals and movement detector 1846 can be configured to generate a movement signal when the touch pad is depressed. Although touch pad 1844 may be widely varied, in this embodiment, touch pad 1844 can include capacitance sensors 1848 and control system 1850 (which can generally correspond to the sensor controller described above) for acquiring position signals from sensors 1848 and supplying the signals to computing device 1842. Control system 1850 can include an application specific integrated circuit (ASIC) that can be configured to monitor the signals from sensors 1848, to compute the absolute location, angular location, direction, speed and/or acceleration of the monitored signals and to report this information to a processor of computing device 1842. Movement detector 1846 may also be widely varied. In this embodiment, however, movement detector 1846 can take the form of a switch that generates a movement signal when touch pad 1844 is depressed. Movement detector 1846 can correspond to a mechanical, electrical or optical style switch. In one particular implementation, movement detector 1846 can be a mechanical style switch that includes protruding actuator 1852 that may be pushed by touch pad 1844 to generate the movement signal. By way of example, the switch may be a tact or dome switch.

Both touch pad 1844 and movement detector 1846 can be operatively coupled to computing device 1842 through communication interface 1854. The communication interface provides a connection point for direct or indirect connection between the input device and the electronic device. Communication interface 1854 may be wired (wires, cables, connectors) or wireless (e.g., transmitter/receiver).

Referring to computing device 1842, it may include processor 1857 (e.g., CPU or microprocessor) configured to execute instructions and to carry out operations associated with computing device 1842. For example, using instructions retrieved from memory, the processor can control the reception and manipulation of input and output data between components of computing device 1842. Processor 1857 can be configured to receive input from both movement detector 1846 and touch pad 1844 and can form a signal/command that may be dependent upon both of these inputs. In most cases, processor 1857 can execute instruction under the control of an operating system or other software. Processor 1857 may be a single-chip processor or may be implemented with multiple components.

Computing device 1842 may also include input/output (I/O) controller 1856 that can be operatively coupled to processor 1857. (I/O) controller 1856 can be integrated with processor 1857 or it may be a separate component as shown. I/O controller 1856 can generally be configured to control interactions with one or more I/O devices that may be coupled to the computing device 1842, as for example input device 1840 and orientation detector 1855, such as an acclerometer. I/O controller 1856 can generally operate by exchanging data between computing device 1842 and I/O devices that desire to communicate with computing device 1842.

Computing device 1842 may also include display controller 1858 that can be operatively coupled to processor 1857. Display controller 1858 can be integrated with processor 1857 or it may be a separate component as shown. Display controller 1858 can be configured to process display commands to produce text and graphics on display screen 1860. By way of example, display screen 1860 may be a monochrome display, color graphics adapter (CGA) display, enhanced graphics adapter (EGA) display, variable-graphics-array (VGA) display, super VGA display, liquid crystal display (e.g., active matrix, passive matrix and the like), cathode ray tube (CRT), plasma displays and the like. In the embodiment illustrated in FIG. 20, the display device corresponds to a liquid crystal display (LCD).

In some cases, processor 1857 together with an operating system operates to execute computer code and produce and use data. The computer code and data can reside within program storage area 1862 that may be operatively coupled to processor 1857. Program storage area 1862 can generally provide a place to hold data that may be used by computing device 1842. By way of example, the program storage area may include Read-Only Memory (ROM), Random-Access Memory (RAM), hard disk drive and/or the like. The computer code and data could also reside on a removable program medium and loaded or installed onto the computing device when needed. In one embodiment, program storage area 1862 can be configured to store information for controlling how the tracking and movement signals generated by the input device may be used, either alone or in combination for example, by computing device 1842 to generate an input event command, such as a single button press for example.

Figure 21A:
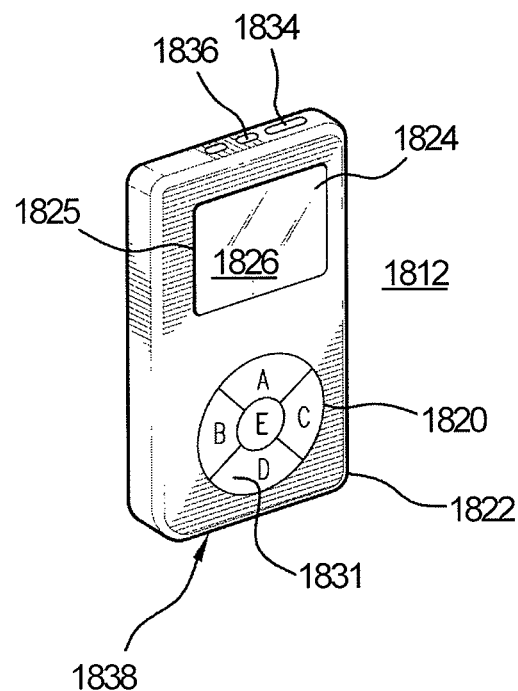
FIGS. 21A-21D illustrate examples of applications of input devices.
Figure 21B:
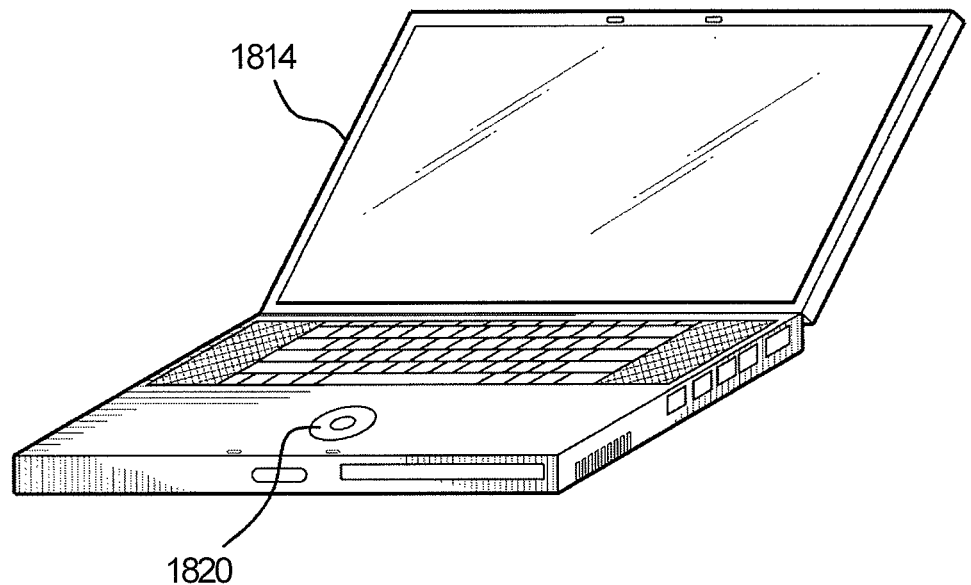
Figure 21C:
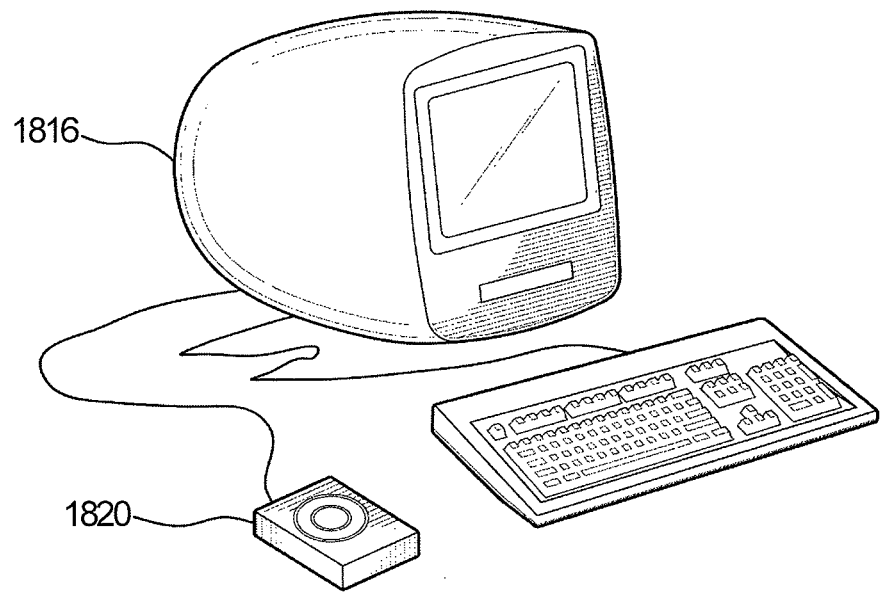
Figure 21D:
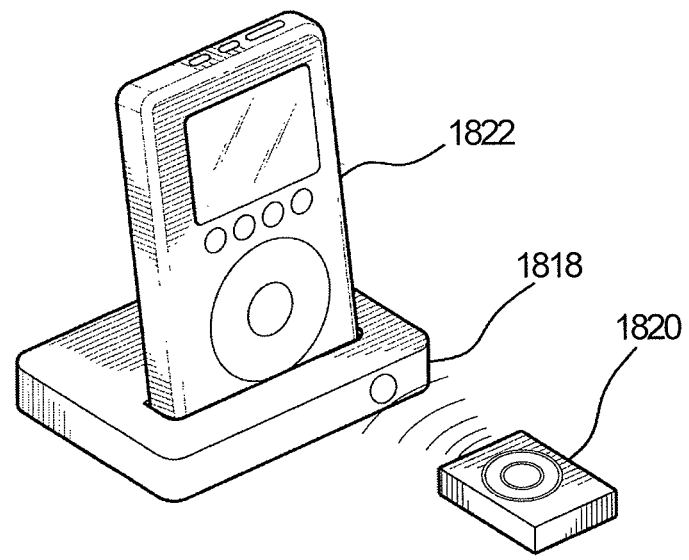

FIGS. 21A-21D illustrate applications of an input device according to some embodiments of the present disclosure. As previously mentioned, the input devices described herein can be integrated into an electronic device or they can be separate stand alone devices. FIGS. 21A-21D show some implementations of input device 1820 integrated into an electronic device. FIG. 21A shows input device 1820 incorporated into media player 1812. FIG. 21B shows input device 1820 incorporated into laptop computer 1814. FIGS. 21C and 21D, on the other hand, show some implementations of input device 1820 as a stand alone unit. FIG. 21C shows input device 1820 as a peripheral device that can be connected to desktop computer 1816. FIG. 21D shows input device 1820 as a remote control that wirelessly connects to docking station 1818 with media player 1822 docked therein. It should be noted, however, that in some embodiments the remote control can also be configured to interact with the media player (or other electronic device) directly, thereby eliminating the need for a docking station. An example of a docking station for a media player may be found in U.S. patent application Ser. No. 10/423,490, entitled "Media Player System," filed Apr. 25, 2003, which is incorporated herein by reference in its entirety. It should be noted that these particular embodiments do not limit the present disclosure and that many other devices and configurations may be used.

Referring back to FIG. 21A, media player 1812, housing 1822 and display screen 1824 may generally correspond to those described above. As illustrated in the embodiment of FIG. 21A, display screen 1824 can be visible to a user of media player 1812 through opening 1825 in housing 1822 and through transparent wall 1826 disposed in front of opening 1825. Although transparent, transparent wall 1826 can be considered part of housing 1822 since it helps to define the shape or form of media player 1812.

Media player 1812 may also include touch pad 1820 such as any of those previously described. Touch pad 1820 can generally consist of touchable outer surface 1831 for receiving a finger for manipulation on touch pad 1820. Although not illustrated in the embodiment of FIG. 21A, beneath touchable outer surface 1831 a sensor arrangement can be configured in a manner as previously described. Information provided by the sensor arrangement can be used by media player 1812 to perform the desired control function on display screen 1824. For example, a user may easily scroll through a list of songs by swirling the finger around touch pad 1820.

In addition to above, the touch pad may also include one or more movable buttons zones A-D as well as a center button E for example. The button zones can be configured to provide one or more dedicated control functions for making selections or issuing commands associated with operating media player 1812. By way of example, in the case of an MP3 music player, the button functions can be associated with opening a menu, playing a song, fast forwarding a song, seeking through a menu, making selections and the like. In some embodiments, the button functions can be implemented via a mechanical clicking action.

The position of touch pad 1820 relative to housing 1822 may be widely varied. For example, touch pad 1820 can be placed at any external surface (e.g., top, side, front, or back) of housing 1822 accessible to a user during manipulation of media player 1812. In some embodiments, touch sensitive surface 1831 of touch pad 1820 can be completely exposed to the user. In the embodiment illustrated in FIG. 21A, touch pad 1820 can be located in a lower front area of housing 1822. Furthermore, touch pad 1820 can be recessed below, level with, or extend above the surface of housing 1822. In the embodiment illustrated in FIG. 21A, touch sensitive surface 1831 of touch pad 1820 can be substantially flush with the external surface of housing 1822.

The shape of touch pad 1820 may also be widely varied. Although illustrated as circular in the embodiment of FIG. 21A, the touch pad can also be square, rectangular, triangular, and the like for example. More particularly, the touch pad can be annular, i.e., shaped like or forming a ring. As such, the inner and outer perimeter of the touch pad can define the working boundary of the touch pad.

Media player 1812 may also include hold switch 1834. Hold switch 1834 can be configured to activate or deactivate the touch pad and/or buttons associated therewith for example. This can be generally done to prevent unwanted commands by the touch pad and/or buttons, as for example, when the media player is stored inside a user's pocket. When deactivated, signals from the buttons and/or touch pad cannot be sent or can be disregarded by the media player. When activated, signals from the buttons and/or touch pad can be sent and therefore received and processed by the media player.

Moreover, media player 1812 may also include one or more headphone jacks 1836 and one or more data ports 1838. Headphone jack 1836 can be capable of receiving a headphone connector associated with headphones configured for listening to sound being outputted by media player 1812. Data port 1838, on the other hand, can be capable of receiving a data connector/cable assembly configured for transmitting and receiving data to and from a host device such as a general purpose computer (e.g., desktop computer, portable computer). By way of example, data port 1838 can be used to upload or download audio, video and other images to and from media player 1812. For example, the data port can be used to download songs and play lists, audio books, ebooks, photos, and the like into the storage mechanism of the media player.

Data port 1838 may be widely varied. For example, the data port can be a PS/2 port, a serial port, a parallel port, a USB port, a Firewire port and/or the like. In some embodiments, data port 1838 can be a radio frequency (RF) link or optical infrared (IR) link to eliminate the need for a cable. Although not illustrated in the embodiment of FIG. 21A, media player 1812 can also include a power port that receives a power connector/cable assembly configured for delivering power to media player 1812. In some cases, data port 1838 can serve as both a data and power port. In the embodiment illustrated in FIG. 21A, data port 1838 can be a USB port having both data and power capabilities.

Although only one data port may be shown, it should be noted that this does not limit the present disclosure and that multiple data ports may be incorporated into the media player. In a similar vein, the data port can include multiple data functionality, i.e., integrating the functionality of multiple data ports into a single data port. Furthermore, it should be noted that the position of the hold switch, headphone jack and data port on the housing may be widely varied, in that they are not limited to the positions shown in FIG. 21A. They can be positioned almost anywhere on the housing (e.g., front, back, sides, top, bottom). For example, the data port can be positioned on the top surface of the housing rather than the bottom surface as shown.

Figure 22A:
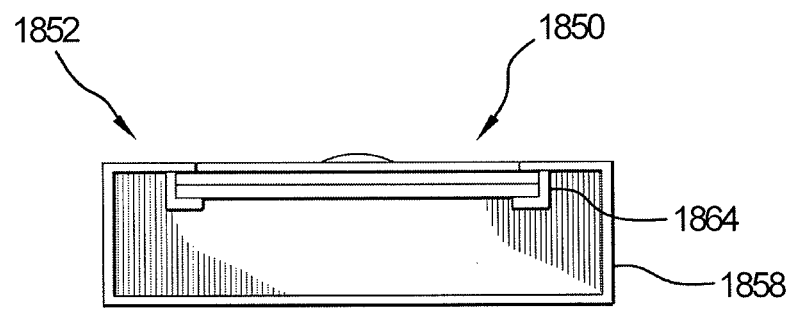
FIGS. 22A-22B illustrate an example of an installation of an input device into a media player.
Figure 22B:
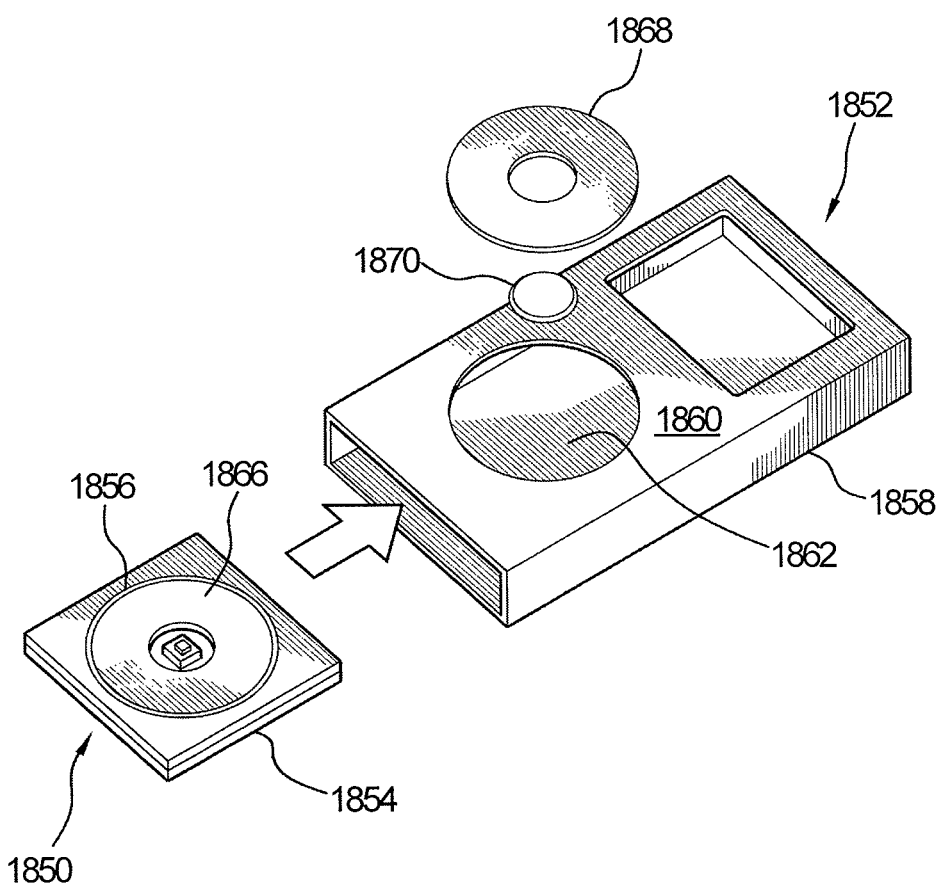

FIGS. 22A and 22B illustrate installation of an input device into a media player according to some embodiments of the present disclosure. By way of example, input device 1850 may correspond to any of those previously described and media player 1852 may correspond to the one shown in FIG. 21A. As shown, input device 1850 may include housing 1854 and touch pad assembly 1856. Media player 1852 may include shell or enclosure 1858. Front wall 1860 of shell 1858 may include opening 1862 for allowing access to touch pad assembly 1856 when input device 1850 is introduced into media player 1852. The inner side of front wall 1860 may include channel or track 1864 for receiving input device 1850 inside shell 1858 of media player 1852. Channel 1864 can be configured to receive the edges of housing 1854 of input device 1850 so that input device 1850 can be slid into its desired place within shell 1858. The shape of the channel can have a shape that generally coincides with the shape of housing 1854. During assembly, circuit board 1866 of touch pad assembly 1856 can be aligned with opening 1862 and cosmetic disc 1868 and button cap 1870 can be mounted onto the top side of circuit board 1866 for example. As shown in the embodiment illustrated in FIG. 22B, cosmetic disc 1868 can have a shape that may generally coincide with opening 1862. The input device can be held within the channel via a retaining mechanism such as screws, snaps, adhesives, press fit mechanisms, crush ribs and the like for example.

Figure 23:
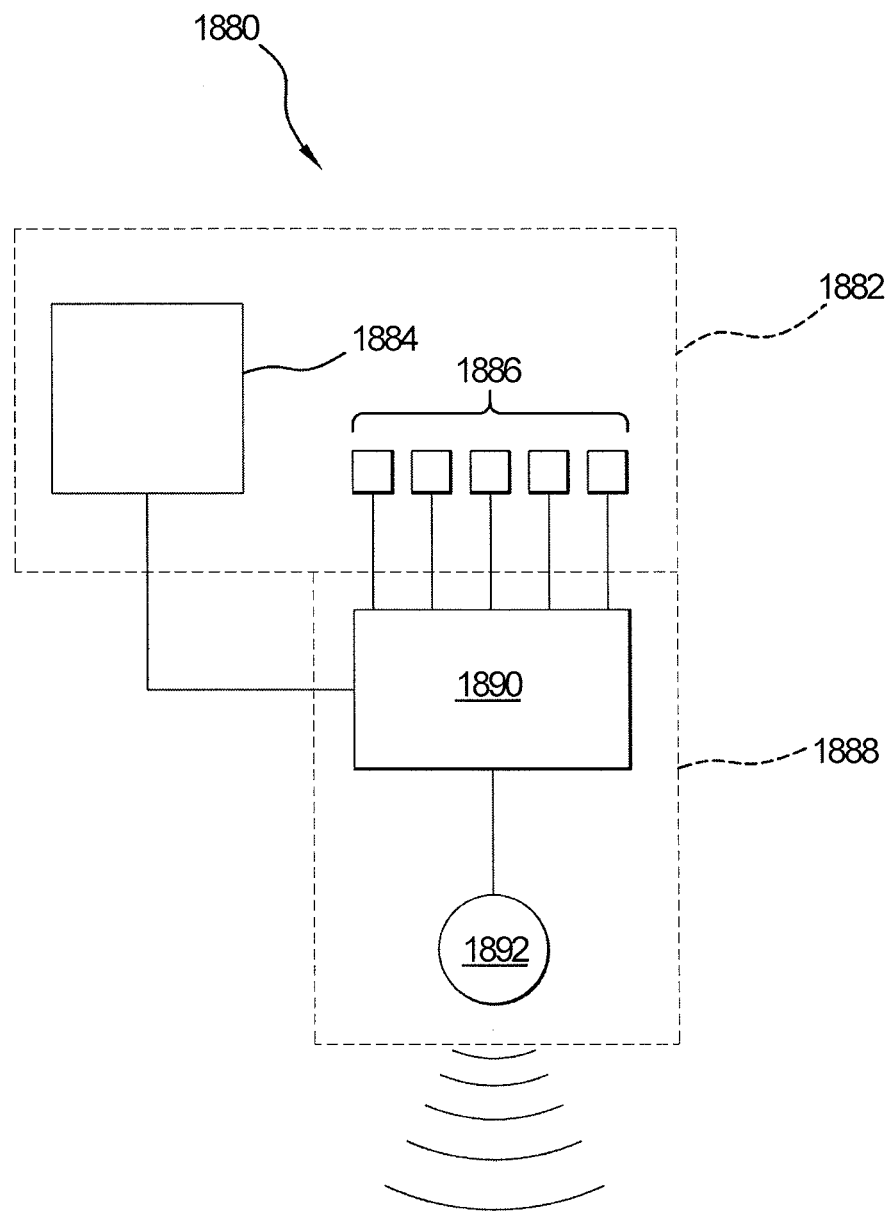
FIG. 23 illustrates an example of a remote control incorporating an input device.

FIG. 23 illustrates a simplified block diagram of a remote control incorporating an input device according to some embodiments of the present disclosure. By way of example, input device 1882 may generally correspond to any of the previously described input devices. In this particular embodiment, input device 1882 may correspond to the input device shown in FIGS. 18A-18C, thus the input device may include touch pad 1884 and plurality of switches 1886. Touch pad 1884 and switches 1886 can be operatively coupled to wireless transmitter 1888. Wireless transmitter 1888 can be configured to transmit information over a wireless communication link so that an electronic device that has receiving capabilities can receive the information over the wireless communication link. Wireless transmitter 1888 may be widely varied. For example, it can be based on wireless technologies such as FM, RF, Bluetooth, 802.11 UWB (ultra wide band), IR, magnetic link (induction) and the like for example. In the embodiment illustrated in FIG. 23, wireless transmitter 1888 can be based on IR. IR generally refers to wireless technologies that convey data through infrared radiation. As such, wireless transmitter 1888 may generally include IR controller 1890. IR controller 1890 can take the information reported from touch pad 1884 and switches 1886 and convert this information into infrared radiation, as for example using light emitting diode 1892.

It will be appreciated that the above description for clarity has described embodiments of the disclosure with reference to different functional units and processors. However, it will be apparent that any suitable distribution of functionality between different functional units or processors may be used without detracting from the disclosure. For example, functionality illustrated to be performed by separate processors or controllers may be performed by the same processors or controllers. Hence, references to specific functional units may be seen as references to suitable means for providing the described functionality rather than indicative of a strict logical or physical structure or organization.

The disclosure may be implemented in any suitable form, including hardware, software, firmware, or any combination of these. The disclosure may optionally be implemented partly as computer software running on one or more data processors and/or digital signal processors. The elements and components of an embodiment of the disclosure may be physically, functionally, and logically implemented in any suitable way. Indeed, the functionality may be implemented in a single unit, in a plurality of units, or as part of other functional units. As such, the disclosure may be implemented in a single unit or may be physically and functionally distributed between different units and processors.

One skilled in the relevant art will recognize that many possible modifications and combinations of the disclosed embodiments can be used, while still employing the same basic underlying mechanisms and methodologies. The foregoing description, for purposes of explanation, has been written with references to specific embodiments. However, the illustrative discussions above are not intended to be exhaustive or to limit the disclosure to the precise forms disclosed. Many modifications and variations can be possible in view of the above teachings. The embodiments were chosen and described to explain the principles of the disclosure and their practical applications, and to enable others skilled in the art to best utilize the disclosure and various embodiments with various modifications as suited to the particular use contemplated.

What is claimed is:

1. An input device comprising:
a touch sensitive input element,
a touch sensitive surface arranged around the touch sensitive input element,
the touch sensitive input element and touch sensitive surface being configured to enable relative displacement between the touch sensitive input element and the touch sensitive surface surrounding the touch sensitive input element when the touch sensitive input element is depressed relative to the touch sensitive surface, and
a controller that detects input sensed by at least one of the touch sensitive input element and the touch sensitive surface.

2. The input device of claim 1 wherein the controller detects a gesture traversing the touch sensitive surface and the touch sensitive input element.

3. The input device of claim 1, wherein
the touch sensitive surface is enabled by a first plurality of circumferentially arranged sensor elements, the first plurality of sensor elements being concentrically arranged relative to the touch sensitive input element, and wherein the controller is configured to detect a gesture traversing the first plurality of sensor elements and the touch sensitive input element.

4. The input device of claim 3, wherein the touch sensitive surface is enabled by a second plurality of circumferentially arranged sensor elements, the second plurality of sensor elements being concentrically arranged relative to the touch sensitive input element, and wherein the controller is configured to detect a gesture traversing the first plurality of sensor elements, the second plurality of sensor elements and the touch sensitive input element.

5. The input device of claim 1, wherein a user interface application is configured to be executed in response to the detection of the gesture.

6. The input device of claim 1, wherein the gesture comprises a linear motion.

7. The input device of claim 1, wherein the gesture comprises a linear motion and a user interface application is configured to change a display of content in response to the detection of the gesture.

8. The input device of claim 3, wherein the first plurality of sensor elements comprise capacitive sensor elements.

9. The input device of claim 3, wherein the first plurality of sensor elements are concentrically arranged relative to one or more capacitive sensor elements.

10. The input device of claim 3, wherein the first plurality of sensor elements are concentrically arranged relative to a trackpad.

11. The input device of claim 1, wherein the controller is configured to detect a simultaneous presence of two or more objects on the touch sensitive surface and the touch sensitive input element.

12. The input device of claim 11, wherein the controller is configured to execute a user interface application in response to the simultaneous detection of the objects.

13. The input device of claim 12, wherein the simultaneous detection comprises the controller sensing a first object on the touch sensitive surface, and the controller sensing a second object the touch sensitive surface.

14. The input device of claim 12, wherein the simultaneous detection comprises the controller sensing a first object on the touch sensitive input element, and the controller sensing a second object on the touch sensitive surface.

15. The input device of claim 12, wherein the simultaneous detection comprises the controller detecting a pinching gesture by two objects.

16. The input device of claim 12, wherein the simultaneous detection comprises the controller detecting a presence of a first of two objects on the touch sensitive input element, and the controller detecting a rotation of a second of the two objects on the touch sensitive surface.

17. The input device of claim 5, wherein the user interface application comprises a zoom-in or a zoom-out operation executed in response to the rotation of the second object on the touch sensitive surface while the first object touches the touch sensitive input element.

18. The input device of claim 1, wherein the touch sensitive input element comprises a fingerprint sensor.

* * * * *

UNITED STATES PATENT AND TRADEMARK OFFICE
CERTIFICATE OF CORRECTION

| | | |
|---|---|---|
| PATENT NO. | : 8,866,780 B2 | Page 1 of 1 |
| APPLICATION NO. | : 13/858603 | |
| DATED | : October 21, 2014 | |
| INVENTOR(S) | : Rathnam et al. | |

It is certified that error appears in the above-identified patent and that said Letters Patent is hereby corrected as shown below:

On the Title Page, Item (56)

On page 6, column 2, under "Other Publications", line 10, delete "gentily" and insert -- gently --, therefor.

On page 6, column 2, under "Other Publications", line 13, delete "retreived" and insert -- retrieved --, therefor.

On page 7, column 1, under "Other Publications", line 25, delete "Grahics" and insert -- Graphics --, therefor.

On page 7, column 1, under "Other Publications", line 37, delete "promies?" and insert -- promises? --, therefor.

On page 7, column 2, under "Other Publications", line 25, delete "Intellvision™" and insert -- Intellivision™ --, therefor.

On page 8, column 2, under "Other Publications", line 9, before "Action" insert -- Office --.

In the Claim

Column 24, line 2, claim 13, after "object" insert -- on --.

Signed and Sealed this
Twenty-fourth Day of March, 2015

Michelle K. Lee
*Director of the United States Patent and Trademark Office*